United States Patent
Henderson

(10) Patent No.: US 11,170,024 B2
(45) Date of Patent: Nov. 9, 2021

(54) APPARATUS AND METHOD PROVIDING FLEXIBLE HIERARCHIES IN DATABASE APPLICATIONS

(71) Applicant: ServiceNow, Inc., Santa Clara, CA (US)

(72) Inventor: Lisa Henderson, Temecula, CA (US)

(73) Assignee: ServiceNow, Inc., Santa Clara, CA (US)

( * ) Notice: Subject to any disclaimer, the term of this patent is extended or adjusted under 35 U.S.C. 154(b) by 189 days.

(21) Appl. No.: 16/244,895

(22) Filed: Jan. 10, 2019

(65) Prior Publication Data

US 2019/0220469 A1    Jul. 18, 2019

Related U.S. Application Data

(63) Continuation of application No. 14/992,388, filed on Jan. 11, 2016, now Pat. No. 10,204,149.

(60) Provisional application No. 62/102,709, filed on Jan. 13, 2015.

(51) Int. Cl.
| | | |
|---|---|---|
| *G06F 17/00* | (2019.01) | |
| *G06F 16/28* | (2019.01) | |
| *G06F 16/21* | (2019.01) | |
| *G06F 16/25* | (2019.01) | |

(52) U.S. Cl.
CPC ............ *G06F 16/282* (2019.01); *G06F 16/21* (2019.01); *G06F 16/252* (2019.01)

(58) Field of Classification Search
None
See application file for complete search history.

(56) References Cited

U.S. PATENT DOCUMENTS

| | | |
|---|---|---|
| 5,701,460 A | 12/1997 | Kaplan et al. |
| 5,987,140 A | 11/1999 | Rowney et al. |
| 5,999,517 A | 12/1999 | Koning et al. |
| 6,006,236 A * | 12/1999 | Young .................... G06F 16/94 |

(Continued)

OTHER PUBLICATIONS

Racz et al., "IT Governance, Risk & Compliance (GRC) Status Quo and Integration an Explorative Industry Case Study", IEEE World Congress on Services, 2011.

(Continued)

*Primary Examiner* — Hasanul Mobin
(74) *Attorney, Agent, or Firm* — Fletcher Yoder PC

(57) ABSTRACT

A computer-driven system manages databases of flexible storage hierarchy. Computer servers include machine-readable storage containing at least one database, the database comprising multiple data records represented by multiple nodes. Each node has a node type and represents records of a corresponding record type. The nodes are embodied by machine-readable data stored in one or more tables. Multiple client-originated direct links are embodied by data stored in the one or more tables, where each one of the direct links directly connecting a different pair of the nodes. Multiple system-originated calculated links are embodied by data stored in the one or more tables. Each calculated link acts in observance with a rules framework to connect pairs of the nodes that would otherwise be connected only indirectly through one or more intermediate nodes and direct links between said intermediate nodes.

20 Claims, 16 Drawing Sheets

(56) References Cited

U.S. PATENT DOCUMENTS

| | | | |
|---|---|---|---|
| 6,222,559 B1* | 4/2001 | Asano | G06T 11/206 |
| | | | 345/440 |
| 6,301,244 B1* | 10/2001 | Huang | H04L 45/12 |
| | | | 370/238 |
| 6,405,207 B1 | 6/2002 | Petculescu et al. | |
| 6,466,932 B1 | 10/2002 | Dennis et al. | |
| 6,538,651 B1 | 3/2003 | Hayman et al. | |
| 7,454,375 B1 | 11/2008 | Gutierrez et al. | |
| 8,417,654 B1* | 4/2013 | Cao | G06Q 30/02 |
| | | | 706/14 |
| 8,429,197 B1 | 4/2013 | Desai et al. | |
| 8,436,867 B1* | 5/2013 | Duff | G06T 15/005 |
| | | | 345/581 |
| 8,661,059 B1 | 2/2014 | Couglas | |
| 8,744,895 B2 | 6/2014 | Raghavendra et al. | |
| 9,037,571 B1* | 5/2015 | Baranowski | G06F 16/9024 |
| | | | 707/716 |
| 2001/0051946 A1 | 12/2001 | Nishikawa | |
| 2002/0099952 A1 | 7/2002 | Lambert et al. | |
| 2002/0103661 A1* | 8/2002 | Albazz | G06Q 50/18 |
| | | | 705/311 |
| 2002/0174340 A1 | 11/2002 | Dick et al. | |
| 2004/0107124 A1 | 6/2004 | Sharpe et al. | |
| 2005/0086531 A1 | 4/2005 | Kenrich | |
| 2005/0289150 A1* | 12/2005 | Kudo | G06F 21/6218 |
| 2007/0008884 A1* | 1/2007 | Tang | H04L 47/283 |
| | | | 370/230 |
| 2007/0101432 A1 | 5/2007 | Carpenter | |
| 2007/0211637 A1* | 9/2007 | Mitchell | H04L 45/50 |
| | | | 370/238 |
| 2009/0022070 A1* | 1/2009 | Iovanna | H04L 45/22 |
| | | | 370/256 |
| 2009/0132557 A1* | 5/2009 | Cohen | G06Q 10/10 |
| 2009/0232030 A1* | 9/2009 | Suzuki | H04L 45/26 |
| | | | 370/256 |
| 2009/0265209 A1 | 10/2009 | Swaminathan et al. | |
| 2009/0319312 A1* | 12/2009 | Moerdler | G06Q 10/06316 |
| | | | 705/7.28 |
| 2010/0275263 A1 | 10/2010 | Bennett et al. | |
| 2010/0319067 A1 | 12/2010 | Mohanty et al. | |
| 2010/0324952 A1* | 12/2010 | Bastos | G06Q 10/0635 |
| | | | 705/7.28 |
| 2011/0112973 A1 | 5/2011 | Sanghvi | |
| 2011/0205919 A1* | 8/2011 | Imai | H04L 45/00 |
| | | | 370/252 |
| 2012/0004945 A1* | 1/2012 | Vaswani | G06Q 10/0635 |
| | | | 705/7.28 |
| 2012/0011077 A1 | 1/2012 | Bhagat | |
| 2013/0226662 A1 | 8/2013 | LeVine et al. | |
| 2014/0129593 A1 | 5/2014 | Couglas | |
| 2016/0065588 A1* | 3/2016 | Wheeler | G06F 13/4282 |
| | | | 713/160 |
| 2016/0156733 A1* | 6/2016 | Farhadi | H04L 67/2842 |
| | | | 709/213 |
| 2016/0292567 A1* | 10/2016 | George | G06N 3/0445 |
| 2016/0352786 A1* | 12/2016 | Shelton | H02J 7/007 |

OTHER PUBLICATIONS

Moeller, Robert R.; "COSO Enterprise Risk Management: Establishing Effective Governance, Risk, and Compliance GRC) Processes." vol. 560. John Wiley & Sons, 2011. Excerpt from book downloaded Dec. 18, 2014 from http://ebooks.harotama.ac.idlfiles/COS0%20Enterprise%20Risk%20Management;%20Establishing%20Effective%20Governance,%20Risk,%20and%20Compliance%20Processes%20%282nd%20Edition%29/Cover"/o20&%20Table%20of%20Contents%20-%20COS0%20Enterprise%20Risk%20Management%20%282nd%20Edition%29.pdf. 19 pp.

Nissen, V. and Marekfia, W.; "The Development of a Data-Centred Conceptual Reference Model for Strategic GRCManagement." Journal of Service Science and Management, 2014, 7, 63-76. Published Online Apr. 2014 in SciRes.

Xue, et al.; "Exploiting the Hierarchical Structure for Link Analysis." In Proceedings of the 28th Annual International 1 \CM SIGIR Conference on Research and Development in information retrieval (SIGIR '05). ACM, New York, NY, USA 186-193. Aug. 15-19, 2005.

http://lwww.unifiedcompliance.com/corporate-database-package; Unified Compliance Framework, The Science of Compliance, "UCF Corporate Database Package". Downloaded Dec. 18, 2014, 1 page.

http://lwww.unifiedcompliance.com/about/latest-news/UCF-Granted-Patent-for-Ground-Breaking-Compliance-Methodology; United Compliance Framework, The Science of Compliance, "UCF Granted Patent for Ground-Breaking Compliance Methodology". Downloaded Dec. 18, 2014, 2 pp.

http://lwww.unifiedcomplace.com/about/latest-news/TheUCF%C2%AEAnnouncesUCFinterchangetoSupportCybersecurity; United Compliance Framework, The Science of Compliance, The UCF Announces UCFinterchange to Support Cybersecurity. Downloaded Dec. 18, 2014, 4 pp.

McMorran, A.W. et al.; "A common information model (CIM) toolkit framework implemented in Java," IEEE Transactions on Power Systems, vol. 21, No. 1, pp. 194-201, Feb. 2006.

* cited by examiner

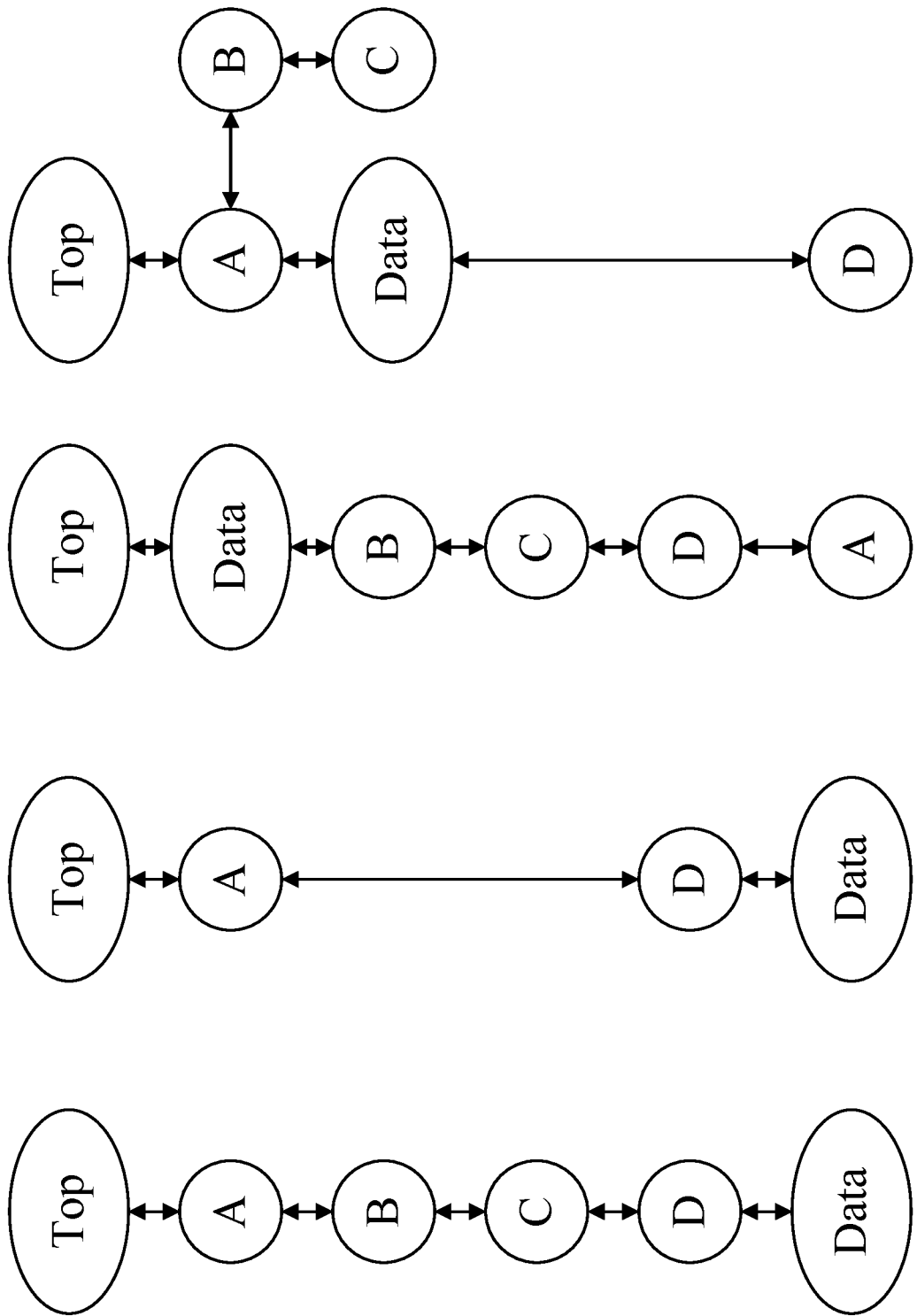

APPARATUS AND METHOD PROVIDING FLEXIBLE HIERARCHIES IN DATABASE APPLICATIONS

CROSS REFERENCE TO RELATED APPLICATIONS

The present application is a continuation of U.S. patent application Ser. No. 14/992,388, filed on Jan. 11, 2016, entitled, "APPARATUS AND METHOD PROVIDING FLEXIBLE HIERARCHIES IN DATABASE APPLICATIONS", which claims the benefit of U.S. Provisional Application No. 62/102,709, filed Jan. 13, 2015, entitled, "APPARATUS AND METHOD PROVIDING FLEXIBLE HIERARCHIES IN DATABASE APPLICATIONS," both of which are herein incorporated by reference.

TECHNICAL FIELD

The present disclosure relates in general to a system, server, and method for efficiently operating a database, and more particularly, a flexible and variable hierarchical database.

BACKGROUND

Databases and associated tasks utilized in operations that manage large volumes of data are often rigid in their structure and do not readily adapt to dynamically evolving conditions. Furthermore, adaptation may be slow and costly when numerous different sources are utilized by the database.

By way of example, one particular application in which such rigidity is problematic is the area of information technology governance, risk, and compliance (IT-GRC). IT-GRC concerns the related disciplines of controlling and directing an organization or entity, and monitoring and ensuring the organization's compliance with applicable regulations.

IT-GRC applications are used by some enterprises to help ensure compliance with an ever-increasing number of regulations. Some examples of regulations managed by IT-GRC applications include Sarbanes-Oxley Act of 2002 (SOX), CoBIT control Objectives, FDA cGMP regulations, National Institute of Standards and Technology 800-53 (NIST 800-53), and the like. A company may, for example, implement a GRC application to sustain SOX compliance. The GRC application may be used, for example, to test a number of controls validating that policies and regulations are being followed for a related change management process.

The practice of GRC may be expensive and labor intensive. Errors have significant consequences in the form of penalties for regulatory violations. For this reason, some are turning to GRC software packages. Still, such software may be difficult to implement because the core functions of GRC are often managed using a variety of dissimilar and heterogeneous machines and software applications. It may be a challenge to compile, assess, and analyze data from these various sources.

The problems are multiplied for software packages that manage GRC (or other types of) data for multiple companies. Often, different companies employ different and seemingly incompatible strategies and hierarchies in organizing their data records. As data records inevitably employ complicated relationships and layers, this often requires the services of a programmer just to produce a simple report. These challenges present substantial challenges to efficiently and accurately assimilating, analyzing, and reporting information from diverse systems, such as GRC systems.

SUMMARY

Disclosed herein are implementations of a system, method, and apparatus to manage a database with a flexible storage hierarchy.

In an implementation, a computer-based server is provided with a variable hierarchical architecture database, comprising a processor, a network interface comprising input/output connections connected to a network to communicate data from the server to remote clients via the input/output connections over the network, a plurality of modules comprising stored instructions executable on the processor, multiple digital data storage devices each comprising a memory and each communicatively coupled to the processor, the storage devices storing the hierarchical architecture database, wherein the database comprises multiple data records represented by multiple nodes, each node comprising node data of a node type and representing records of a corresponding record type stored in a table in the memory, multiple client-originated direct links comprising data stored in the table, each one of the direct links directly connecting a different pair of the nodes, a prescribed rules framework stored in the memory and comprising a plurality of rules, and multiple system-originated calculated links comprising data stored in the table, each calculated link based on a rule of the plurality of rules in the prescribed rules framework that directly connects pairs of the nodes that would otherwise only be indirectly connected through a directly connected intermediate node.

In an implementation, a computer implemented method is provided for managing a variable hierarchical architecture database in a server, the method comprising utilizing a processor of the server for creating the database in a memory associated with the processor storing multiple data records represented by multiple nodes, each node having a node type and representing records of a corresponding record type, the nodes embodied by machine-readable data stored in a table, storing multiple client-originated direct links embodied by data stored in the table, each one of the direct links directly connecting a different pair of the nodes, and calculating multiple system-originated calculated links comprising data stored in the table, each calculated link based on a rule of a plurality of rules in a prescribed rules framework to connect pairs of the nodes that would otherwise only be indirectly connected through a directly connected intermediate node.

A non-transitory computer-readable storage medium, comprising executable instructions that, when executed by a processor, facilitate performance of the above-described method is also provided.

BRIEF DESCRIPTION OF THE DRAWINGS

The description herein makes reference to the accompanying drawings wherein like reference numerals refer to like parts throughout the several views.

FIG. 22 is a block diagram of an example database hierarchy outside the IT-GRC context.

FIG. 23 is a block diagram of an example database hierarchy outside the IT-GRC context.

FIG. 24 is a block diagram of an example database hierarchy outside the IT-GRC context.

FIG. 25 is a block diagram of an example database hierarchy outside the IT-GRC context.

DETAILED DESCRIPTION

Figure 1A:
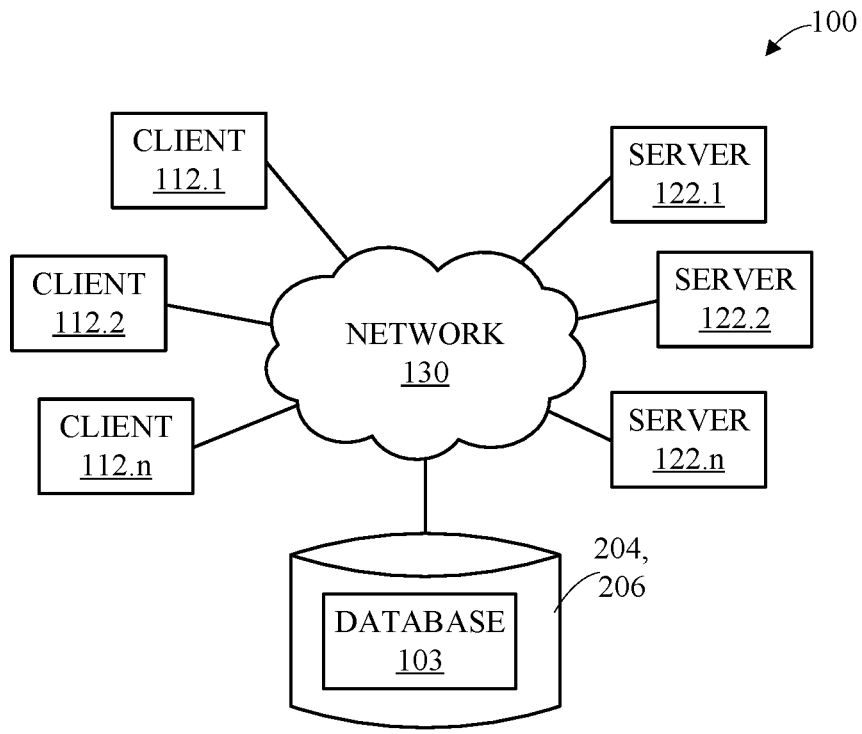
FIG. 1A is a block diagram of a networked distributed or cloud computing system in which the teachings herein may be implemented.

One implementation of this disclosure concerns a computerized system to manage databases with flexible storage hierarchies. The subject database, in one illustrative example, is used to provide IT-GRC support functions. Some examples of these functions include documenting policies and procedures, defining controls based on policies, generating audits and tests to ensure that controls are being followed, and generating remediation tasks to track corrective actions that are required. The database provides a hierarchy of multiple nodes comprising at least one of the following node types: a) authoritative source; and b) control. Each node may, for example, be embodied by storing one or more records in a table. Each node represents a type of record, and there may be zero or one or many records of that type.

Broadly, an authoritative source is a document that defines the external standards, frameworks, or regulations that a process must use. A policy document defines a client's internal practice that processes must follow. A risk (or possible exposure) is a definition of the possible consequence of failing to comply with a policy, standard, or law.

A control is a process to reduce exposure, enforce a mandated policy statement, or address the directive of an authoritative source. Controls have control tests that validate if the control is properly being followed.

Between each of these tables, each combination, tables having many-to-many relationships link up the items in all their combinations. A single control may link to several authoritative sources, contents, policies, and potential exposures, and vice versa. There is no universal or standard hierarchy for these elements. Some have the potential exposure as a primary element linked to the authoritative source, and potential exposures have policies to reduce them, and controls to ensure the potential exposure is being monitored. Others have policies linked to authoritative sources, and each policy has potential exposures and controls linked to it. Some clients may break an authoritative source into multiple authoritative source content elements and link their controls and policies to the particular sections they cover, others make only an authoritative source.

A computer-driven system is programmed to analyze the interconnections to discover indirect relationships between the nodes by an analysis module. The interconnections, for instance, may comprise machine-readable records representing links between table entries. In effect, this operation works with a rules framework that is applicable for any possible hierarchy.

Based upon the discovered interconnections, the computer-driven system stores calculated links representing every possible interconnection to the authoritative source and every possible interconnection to the control test data via the control. Also, responsive to any of records, tables, and properties of the nodes experiencing an update, the computer-driven system dynamically updates the calculated links, which includes creating, updating (as when an indirect connection between two nodes is broken, but a different path remains to connect them, so the links is updated to reflect the path used), or removing calculated link records affected by the update.

Figure 1B:
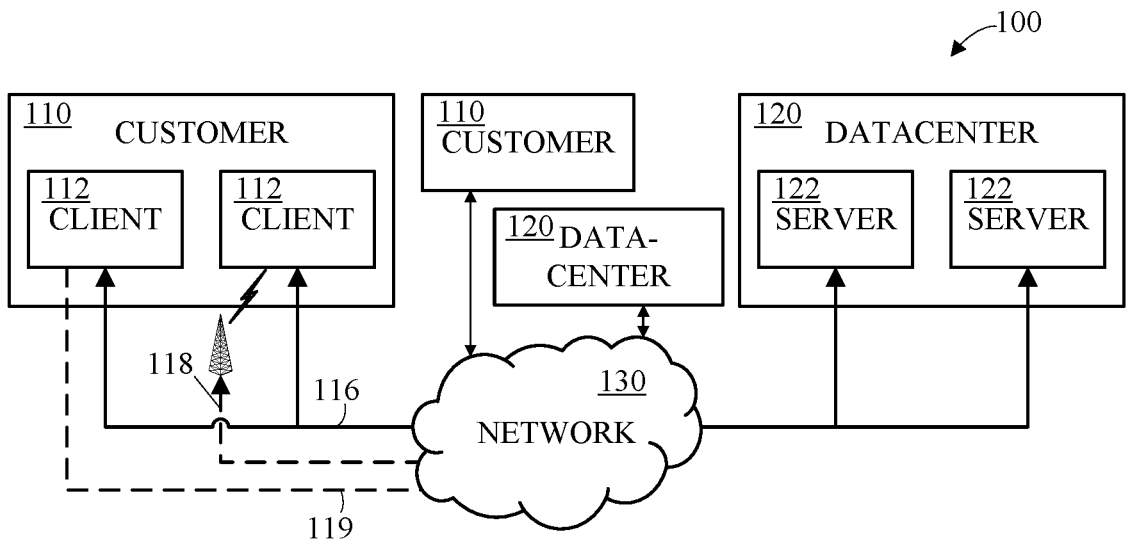
FIG. 1B is a block diagram of a networked distributed or cloud computing system in which the teachings herein may be implemented.

To describe some implementations in greater detail, reference is first made to some example hardware structures and interconnections. FIGS. 1A and 1B are block diagrams of a networked distributed or cloud computing system. The system 100 includes various computer servers 122.1-n (collectively, or representatively, referred to as 122) and clients 112.1-n (112) coupled via a network 130. One example of the network 130 is the public Internet, and other examples include at least one local area network, wide area network, Intranet, Extranet, Internetwork, Wi-Fi network, or any other suitable technology using wires, radiofrequency, microwave, satellite, cellular, optical, or other telecommunications. The system 100 includes one or more digital data storage devices 204, 206 (volatile and non-volatile). Examples of the hardware components and interconnections of the servers 122, clients 112, and data storage devices 204, 206 are discussed in detail below. In one implementation, the computer servers 122 act to manage hierarchical databases of the clients 112, where these databases are stored at 204, 206. One example is the database 103, which may be stored in a single site or location or device, or alternatively, distributed among different sites or locations or devices.

In one implementation, the system 100 may involve cloud computing. Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared among multiple customers. For example, a single web server (such as a unitary Apache installation), application server (such as a unitary Java Virtual Machine) and/or a single database server catalog (such as a unitary MySQL catalog) may handle requests from multiple customers. In a multi-tenant architecture, data or applications used by various customers may be commingled or shared. In an implementation of this architecture, the application and/or database server software may distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of multiple web server instances, multiple application server instances, and multiple database server instances. Each of these server instances may be located on different physical servers and each of these server instances may share resources of the different physical servers with a number of other server instances associated with other customer instances. In a given cloud infrastructure system, different implementations of customer instances may be used for different customer instances at the same time. Other configurations and implementations of customer instances may also be used. The web, application, and database servers of the customer instance may be allocated to different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server may replicate data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers. These features are described in more detail un U.S. patent application Ser. No. 62/098,430, filed Dec. 31, 2014, and U.S. patent application Ser. 14/985,740, filed Dec. 31, 2015, the contents of both being incorporated herein in their entirety.

The application servers may include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances may be configured with a database configuration and schema to facilitate the operation of the platform. For example, the database server instance may be configured with various tables for storing metadata about applications, tables/fields, menus, forms, business rules, scripts, and custom user interface elements that are used to customize the appearance and operation of the customer instance. In some implementations, the application servers may include web server functionality and the web servers may be omitted.

FIG. 1B is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients. Customers and clients may be described more generally as respective user entities/groups and end users.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

The data processing components of this disclosure, including the system 100 of FIG. 1A and the cloud computing environment of FIG. 1B, may be implemented by various hardware devices. The makeup of these subcomponents is described in greater detail below, with reference to FIGS. 3-7.

Figure 2:
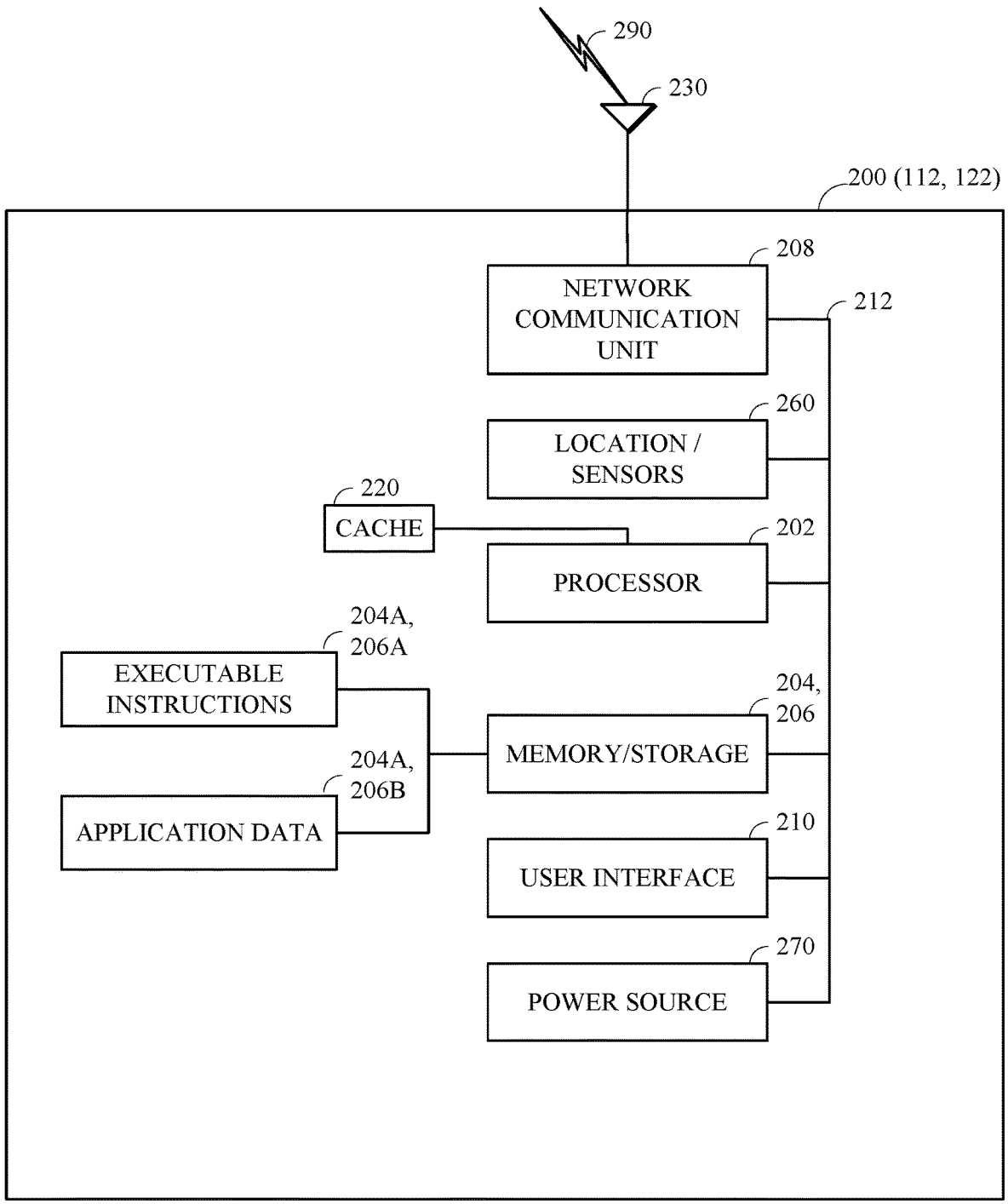
FIG. 2 is a block diagram of an example internal configuration of a computing device, such as a computing device of the computing system as shown in FIGS. 1A and 1B.

FIG. 2 is a block diagram of an example internal configuration of a computing device 200, such as a client 112 or server device 122 of the computing system 100 as shown in FIGS. 1A and 1B, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional aspects of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
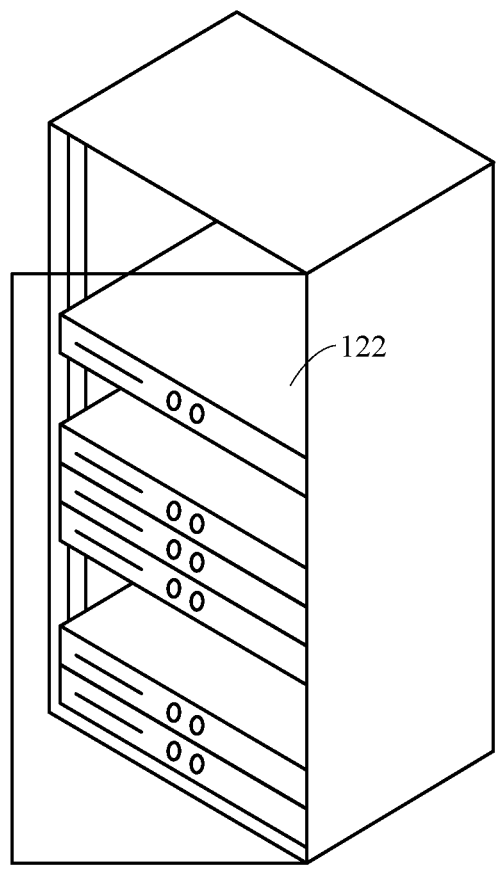
FIG. 3 is a perspective view diagram of an example storage enclosure housing computer servers.
Figure 4:
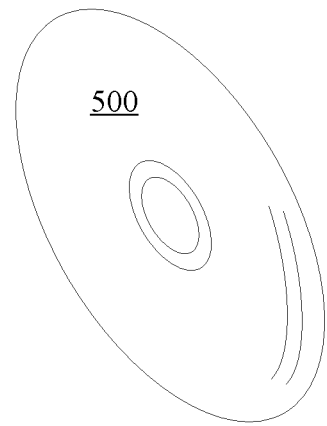
FIG. 4 is a pictorial perspective view of an example storage medium.

FIG. 3 is a perspective view diagram of an example storage enclosure housing computer servers 122. One implementation of this structure includes a computer hardware rack containing rack mounted servers 122. In this example, the computer servers include their own power supplies and network connections. Another implementation includes a blade enclosure containing blade servers. The blade enclosure includes power supplies, cooling units, and networking components shared by the constituent blade servers.

In any case, the storage media may be implemented by nearly any mechanism to digitally store machine-readable signals that are executable by a processor. One example is optical storage such as CD-ROM, WORM, DVD, digital optical tape, disk storage 500 (see FIG. 4, which is a pictorial perspective view of an example storage medium), or other optical storage. Another example is direct access storage, such as a conventional "hard drive," redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium is coupled to a processor so the processor may read information from, and write information to, the storage medium. In the alternative, the storage medium may be integral to the processor. In another example, the processor and the storage medium may reside in an ASIC or other integrated circuit.

Figure 5A:
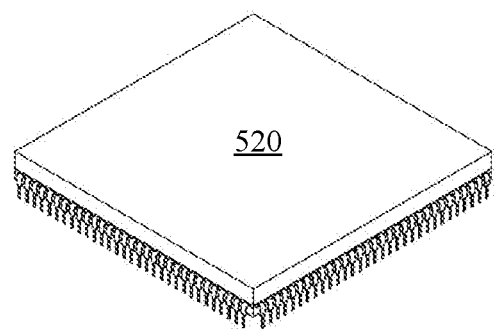
FIG. 5A is a pictorial perspective view of an example type of logic circuitry.
Figure 5B:
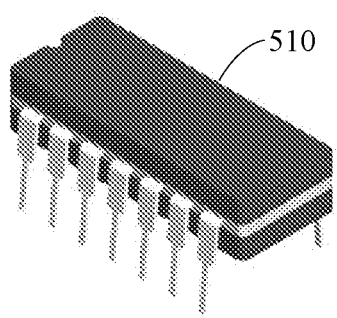
FIG. 5B is a pictorial perspective view of an example type of logic circuitry.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 5A is a pictorial perspective view of example of logic circuitry 510 of a form of a surface mount processor. FIG. 5B is a pictorial perspective view of a different example of logic circuitry 520 in a form of a printed circuit board mountable dual in-line packaged circuit.

More particularly, one or more clients or servers or other machines described herein may include an ASIC or programmable logic array such as a FPGA configured as a special-purpose processor to perform one or more of the operations or operations described or claimed herein. An example FPGA may include a collection of logic blocks and RAM blocks that may be individually configured and/or configurably interconnected in order to cause the FPGA to perform certain functions. Certain FPGAs may contain other general or special purpose blocks as well. An example FPGA may be programmed based on a hardware definition language (HDL) design, such as VHSIC Hardware Description Language or Verilog.

Figure 6:
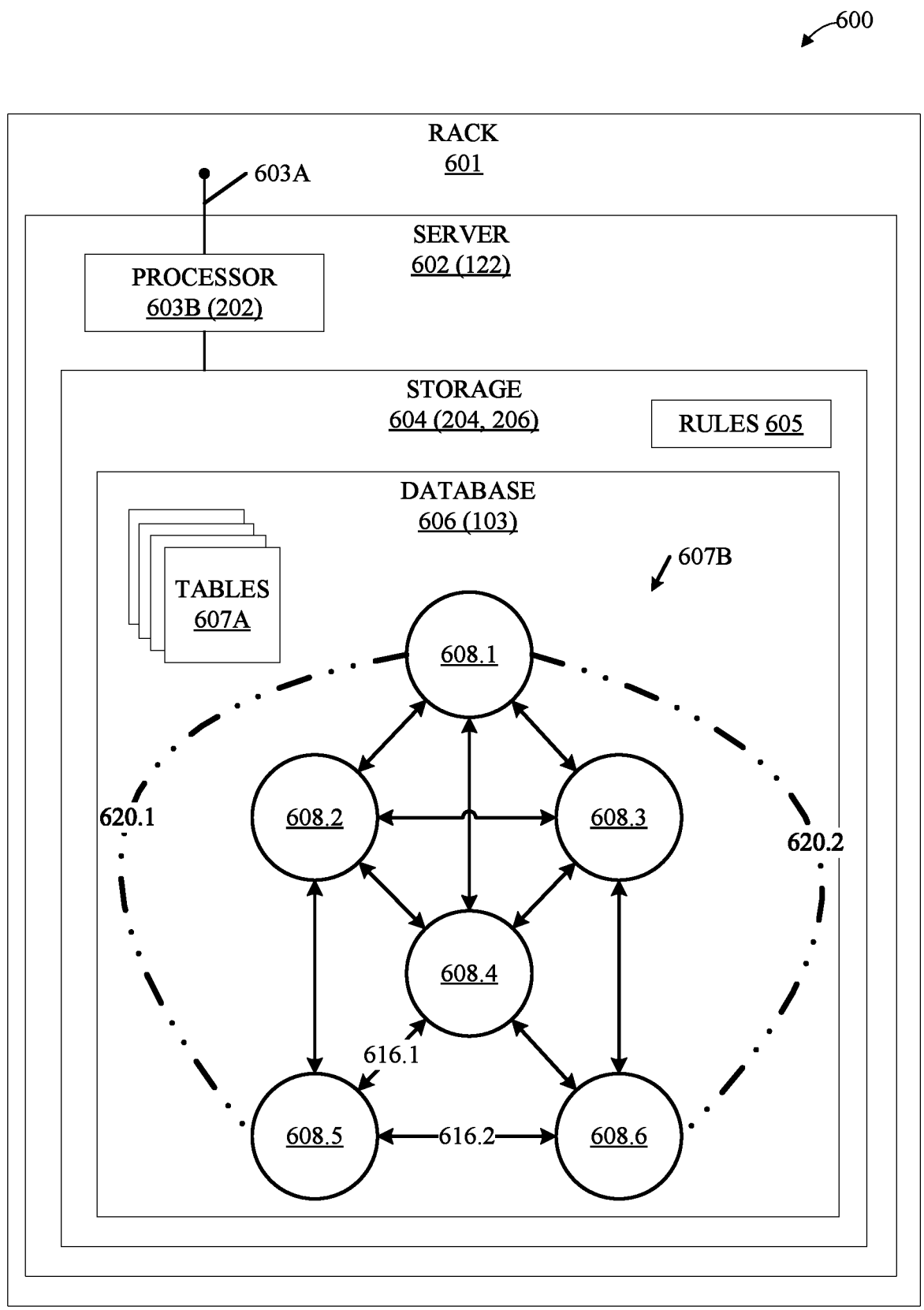
FIG. 6 is a block diagram of an example hardware implementation.

FIG. 6 is a block diagram of an example hardware implementation. More particularly, FIG. 6 shows a computer system 600 including a rack 601 or other storage enclosure, frame, or mounting that houses one or more servers 602, 122. Other servers (not shown) may be mounted to the rack 601 as well. A control center (not shown) may be provided to supervise and collectively manage operations of the computer servers.

The server 602 includes one or more input/output connections 603A with a communications interface (not shown), one or more digital data processing machines/processors 603B (202), and digital data storage 604 (204, 206). The storage 604 includes one or more databases, such as the database 606 (103), and also a framework of rules 605. The rules framework 605 prescribes the logical parameters for creating, modifying, routing, deleting, and otherwise laying out calculated links. The rules framework 604 may be embodied in a specific or general programing language, logic programming, or other tool, data structure, table, program, or format.

In one implementation, there are multiple databases in the server 602 and/or other servers (not shown), and the database 606 stands as one example for explanatory purpose.

In one implementation, the database 606 may be represented in the form of one or more tables such as 607A. Example tables are discussed below. Although the database may be stored in the form of tables 607A, the database 606 may be equivalently represented in a different form, and namely, by a diagrammatic data structure such as 607B that includes various nodes 608.1-6. The database representation 607B may be used to store the database, or merely for discussion purposes in case the related components are actually stored in a different format such as one of the tables 607A.

In the illustrated implementation, the nodes 608 of the database representation 607B are embodied by data stored in the tables 607A. Each node 608 represents at least a top node or data node, and may also represent further node types. As explained in greater detail below, top and data nodes have particular significance to the management of calculated links. As mentioned above, one implementation of a node is a data record in the tables 607A. Besides data records, nodes may additionally, or alternatively, comprise hyperlinks, documents, pages, files, lists, or other contextually appropriate items or units of data.

The structure 607B includes multiple client links, which as an example, may be embodied by records stored in the tables 607A or different tables (not shown). Client links may also be referred to as "direct links." Each client link directly connects a different pair of nodes, such as the client link 616.1 connecting the nodes 608.4 and 608.5 and the client link 616.2 connecting the nodes 608.5 and 608.6. The structure 607B also includes multiple calculated links, which as an example may be embodied by records stored in the tables 607A or different tables (not shown). Each calculated link directly connects a pair of nodes that would, otherwise, only be connected indirectly through one or more intermediate nodes. Some examples include the calculated link 620.1 connecting nodes 608.1 and 608.5, and the calculated link 620.2 connecting nodes 608.1 and 608.6.

Broadly, calculated links may be determined between nodes that are not directly connected. In one implementation, calculated links may be implemented in the form of table 607A records that include "connected-by" fields as explained in greater detail below. Calculated links are formed based on certain rules and may be used to indicate any possible linkage to a certain node, such as an authoritative source node or a control node. Using the calculated links to supplement the direct links allows customized reporting, such as aggregated results, to be generated automatically without requiring the user to create every possible link. Every possible hierarchy may be considered and used to create calculated links to indicate every possible linkage to the authoritative source, and every possible link to the control test data via the control node. These calculated links indicate what path was used to connect the two items together, which may be listed in a connected-by value or field.

For example, a link between an authoritative source node and a policy node that are connected by several other nodes would have a connection where the link in the corresponding table 607A has a connected-by value of: "Via ASC1001 'Section 1.1 HIPAA Regulations' Via RISK1001 'Criminal penalties for release of' Via CTRL1001 'Ensure firewall is tested.'" The calculated links, which include the underlying complexities of client links, support the creation of reports that are more powerful and in some cases only made possible by having the calculated links. In one implementation, connected-by values may be human-readable, so that this data can appear in reports and aid personnel in reviewing, understanding, source tracing, debugging, and otherwise analyzing the reports.

Connected-by values are also used to improve performance when updating calculated links. For instance, when a direct link is deleted, the connected-by information is used to detect calculated links that used the now deleted connection and now need to be deleted.

With information about which nodes the user linked directly together, and which nodes were linked together by calculated links, reports may be written and decisions made based on how everything is linked together, or every link may be treated equally for reports. The number of passing and failing control tests linked directly or indirectly for every policy, potential exposure, and authoritative source nodes may be calculated and provided to see which areas are in danger from a particular control test failure.

Figure 9:
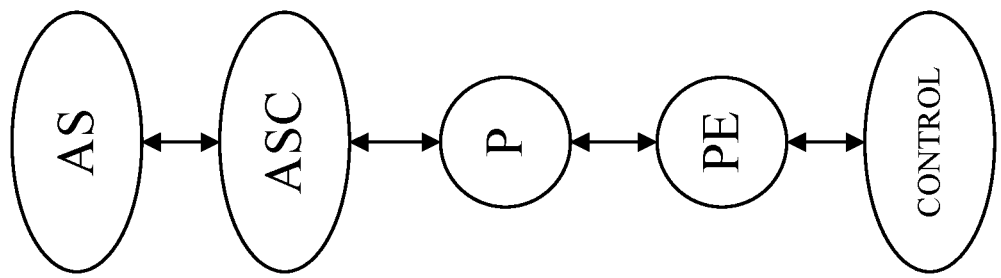
FIG. 9 is a block diagram of an example database hierarchy in an IT-GRC application.

Having described some example hardware implementations above, some example data structures of the disclosure and certain functional aspects are now introduced with reference to FIGS. 9-3. FIGS. 9-13 are block diagrams of example database hierarchies in an IT-GRC application. In these diagrams, each circle represents a node, and namely, records of a given type. The node types include, for example, authoritative source, authoritative source contents, policy, control, and control test results. Lines connecting circles represent many-to-many relationships between records of the types represented by the connected circles. Lines with arrowheads represent client-implemented links (called "client links" or "direct links" herein) between records. These hierarchies may exist simultaneously in the same set of data, in the same or a different database. Curved lines without arrowheads represent calculated links.

The types of records are explained in greater detail as follows. An authoritative source (AS) 1302 (FIG. 13) refers to a type of document that defines the external standards, frameworks, or regulations that a process must use. This is the root of the hierarchy, showing the standard for which compliance is being sought. Some examples include government regulations, industry standards promulgated by standards bodies, and the like. These are stored as references, from which potential exposures, controls, or policies may be defined. The authoritative source may be broken up into authoritative source content records that may be interrelated with authoritative source content relationships. In this way, not only may the authoritative source be viewed as a whole, but the relationships between different sections may be mapped to better record how the authoritative source is meant to be implemented, to see which policies, potential exposures, controls are related to particular sections of the authoritative source. The same relationship mechanism may be used to document relationships across authoritative sources. This is important because different sources address the same or similar controls and objectives. Authoritative source documents may further link, such as by hyperlink, to other documents containing more detailed content.

Authoritative source contents (ASC) 1304 (FIG. 13) enumerate the contents of a related authoritative source, such as chapters of a standard, sections of a regulation, etc. Some data hierarchies use authoritative source contents, and others may omit them. Authoritative source contents may also be used to help track and organize policies, potential exposures, controls when there are sections of a regulation that pertain to your business or department, and others that do not.

Policy (P) documents 1306 (FIG. 13) define an internal practice that processes must follow. A policy table extends knowledge. In an implementation, a policy is a record with some text representing a company policy; the knowledge table is used for convenience, not because policies will map to the knowledge base. Each policy is stored in the knowledge base and may be accessed in the same way as any other published article. To manage elements of the policy, the policy may be associated with: entities managed, authoritative sources with which it is designed to comply, potential exposures associated with failing to comply, and controls in place to enforce the policies and reduce identified potential exposures.

Potential exposures (PE) 1310 (FIG. 13) define possible consequences of failing to comply with a policy, authoritative source, or failing a control. Potential exposures are rated based on potential exposure criteria that may be used to calculate a potential exposure approach. The potential exposure approach calculation is based on potential exposure approach rules that typically use the values contained in significance and likelihood fields in a potential exposure criteria table. This table contains a display value field to allow for text values and a weighting, which may be used to define the potential exposure approach rules. After the potential exposures are defined, they may be associated with controls to identify how they are being reduced.

Controls 1308 are processes to reduce potential exposure, enforce a mandated policy statement, and/or address the directive of an authoritative source. A control may have one or many control tests associated with it. This ensures that the control is effective and provides continued compliance. Controls may also be directly associated with authoritative source content to map an organization's internal controls to those mandated by the authoritative source. In one implementation, the disclosure uses the Unified Compliance Framework (UCF), in order to provide clients with certain common controls. This is a benefit since many regulations contain similar requirements, linking authoritative source or authoritative source contents to controls that can be shared between them, then from there deriving policies and potential exposures from the controls can make compliance easier to maintain. For instance, most regulations have document retention, so one control that covers document retention can be linked to all of the authoritative sources, then a policy about data backup, retention, and the like can be created covering all of those regulations, likewise potential exposures linked to the policy or control will not be duplicated per regulation in the database.

Control test definitions (not shown) determine how and when a control test is performed, including execution operations and expected results. Each time the control test is performed, a control test instance is generated as a task to be executed, according to the control test definition. If the control test benefits from included sample data, such as a verification that servers listed in the configuration management database (CMDB) have the correct configurations, the control test definition may be configured to automatically gather control test sample data from the appropriate table anywhere within the database. Certification filters and templates simplify the selection of records to test. Certification filters provide the scope for test definitions by filtering a table for specific records. A filter may be attached to a template that tests specific attributes of the filtered records. The control test definition includes the ability to define the remediation group that is automatically assigned to a remediation task if the control test instance state is set to "failure." Control test results such as 1312 (FIG. 13) represent results from control tests that validate if a control is being properly followed.

Figure 11:
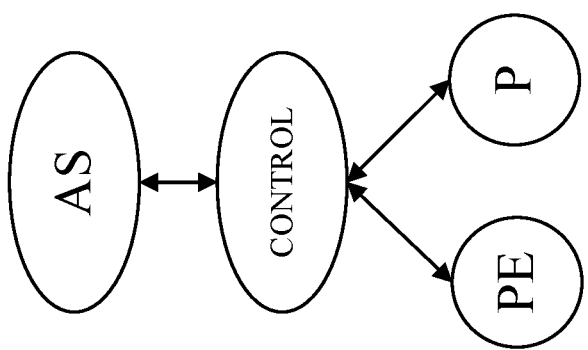
FIG. 11 is a block diagram of an example database hierarchy in an IT-GRC application.
Figure 10:
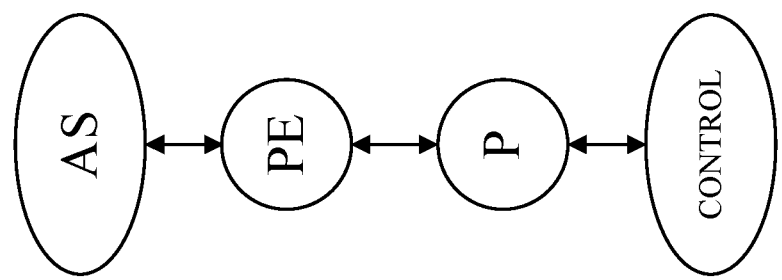
FIG. 10 is a block diagram of an example database hierarchy in an IT-GRC application.

In the present implementation, all illustrated hierarchies necessarily include an authoritative source and a control. The arrangement of FIGS. 9 and 12 add further record types including authoritative source contents, policies, and rules; however, the arrangements of FIGS. 9 and 12 have different structures. Controls do not link to potential exposures in FIG. 12, for example. FIGS. 10 and 11 only add potential exposures and policies to the authoritative source, but each employs a different structure. Potential exposures and policies are not linked to each other in FIG. 11, for example. In each of the hierarchies of FIGS. 9-13, every policy and potential exposure are related to both the control and the authoritative source by client links. By the related control, every policy and potential exposure are further related to the control test results that must be aggregated to the policy, potential exposure, and authoritative source.

FIGS. 9-12 illustrate that the hierarchy of database nodes may take various forms among different clients or even within the same client's data. For example, a client may have an authoritative source, with policies to implement it. Each policy has a potential exposure that needs reduction via a control and the control tests. Another client may have an authoritative source, with the requirements broken into controls. Each control has a policy and potential exposures. There are many different combinations that are possible, and these multiple many-to-many tables support all of them.

The hierarchy of nodes may be flexible. For example, in some implementations, the potential exposure node may be implemented as a primary element linked to the authoritative source node, and have policy nodes to reduce them and control nodes to ensure the potential exposure is being monitored. In others implementations, policy nodes may be linked to authoritative source nodes, while each policy node may have potential exposure nodes and control nodes linked to it. Some clients' databases may break an authoritative source into multiple authoritative source content elements and link their controls and policies to the particular sections they cover, others make only an authoritative source.

Flexible hierarchies in the presently described database applications support the generation of reports across multiple layers of any hierarchy the user may choose. For example, data may be aggregated from one node type to other node types (e.g., from the control node to policies, potential exposures, and authoritative sources) to generate instant and constantly updated information about the aggregated control test information and the authoritative source each item is related to.

Figure 13:
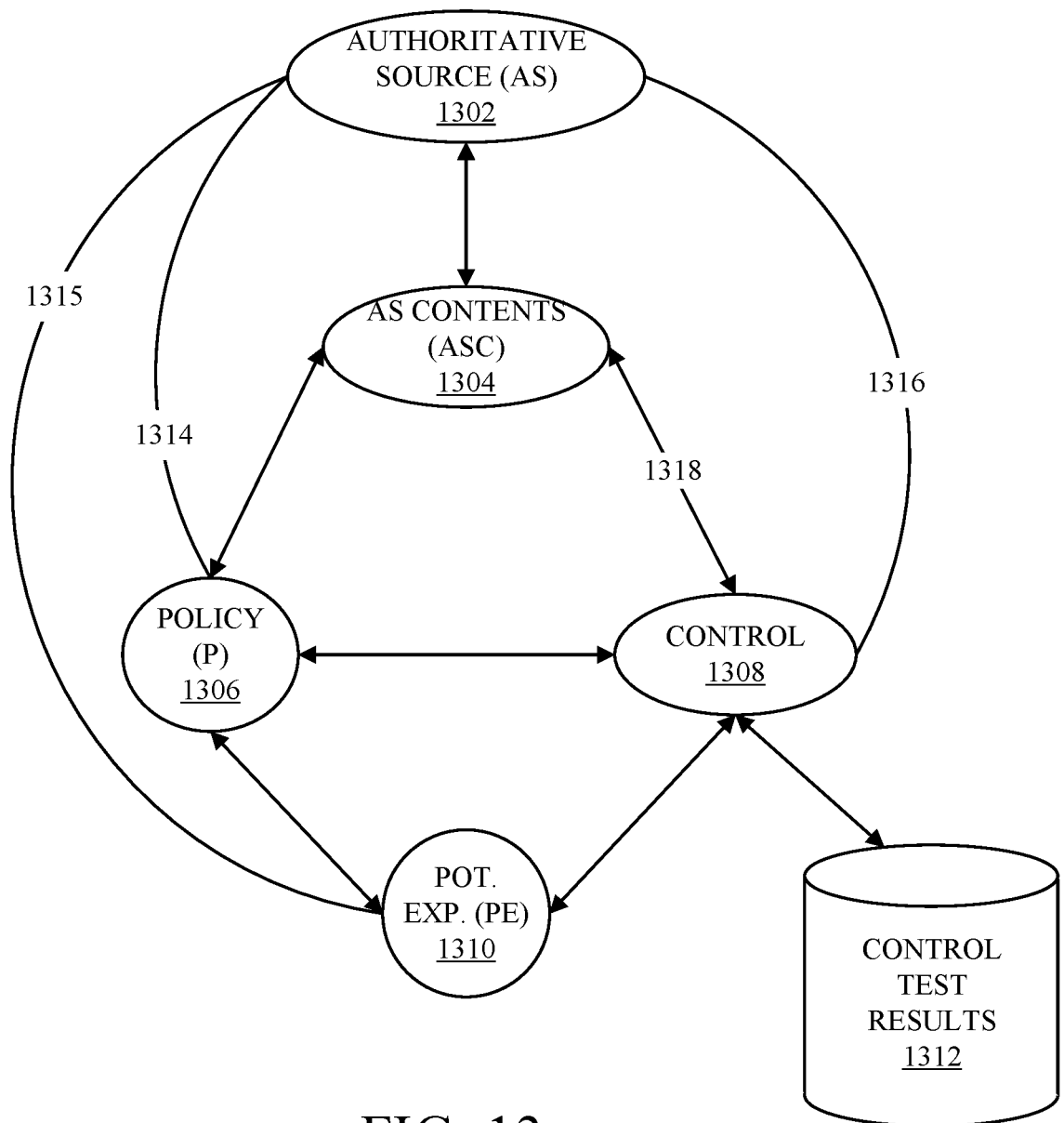
FIG. 13 is a block diagram of an example database hierarchy in an IT-GRC application.

FIG. 13 shows a different database hierarchy, also in an IT-GRC application. The structure of FIG. 13 includes authoritative source type records 1302, authoritative source contents type records 1304, policy type records 1306, control type records 1308, potential exposure type records 1310, and control test results type records 1312. The arrangement of FIG. 13 illustrates all links that are possible, or permitted, under this data hierarchy. This includes client links, shown by straight lines 1318 as well as calculated links (shown by curved lines 1314-1316). The calculated and direct links of FIG. 13 may be implemented, for example, by tables having many-to-many relationships. In one implementation, the direct and calculated links share the same tables.

As discussed above, database applications 606 may implement or support a flexible hierarchy. For example, a known top node may be used for categorization, a data containing node may be used to provide data for other nodes to summarize, and multiple intermediate nodes may represent different paths to follow between the top node and the data containing node and also represent different means of grouping the results of the data containing node. In an implementation, the policy node does not exist only to provide a link between an authoritative source and control, it is also there to provide data and link to all controls so it can be determined which policies have failing control tests, and the control itself may be linked directly to the authoritative source. For example, links between the nodes may represent many-to-many relationships in the database tables. Since different companies may have different approaches to hierarchies, there may be different interrelationships between the records and the database tables.

The database applications described herein represent the regulations applicable to a given client by a set of rules, policies and requirements. These are described in terms of different types of nodes such as authoritative source, policies, potential exposures, and controls in the database tables. For example, authoritative source nodes may be used to represent regulations such as the law, standard, or framework, and may be split into different content sections representing each guideline or section of law. Policy nodes may be used to represent, for example, policies of a company. Control nodes may be used to represent things that need to be monitored and have policies in place to implement varying regulations. For example, control nodes may have control tests that validate if the control is properly being followed. Potential exposure nodes may be used to represent the potential exposures of failing to follow some part of the law, standard, policy, etc. Data records of each node type may be stored in a database table, and between each of these tables, a data record of each node type may be linked to data records of same or other node types in many-to-many relationships. For example, a control node may link to several authoritative source nodes, policy nodes, and potential exposure nodes, etc.

Between each of these tables, each combination, many-to-many relationship tables link up the items in all their combinations. A single control may link to several authoritative sources, contents, policies, and potential exposures, and vice versa. In an implementation, there is no universal or standard hierarchy for these elements. Some have the potential exposure as a primary element linked to the authoritative source, and potential exposures have policies to reduce them, and controls to ensure the potential exposure is being monitored. Others have policies linked to authoritative sources, and each policy has potential exposures and controls linked to it. Some clients may break an authoritative source into multiple authoritative source content elements and link their controls and policies to the particular sections they cover, others make only an authoritative source. Different clients may employ different hierarchies. One client, for example, may have an authoritative source, with policies to implement it, each policy has potential exposures that need reduction, via a control and the control tests. Another client, for example, may have an authoritative source, with the requirements broken into controls, each control has a policy and potential exposures. There are many different combinations that are possible. One implementation uses multiple tables having many-to-many relationships to support all of these.

Figure 21:
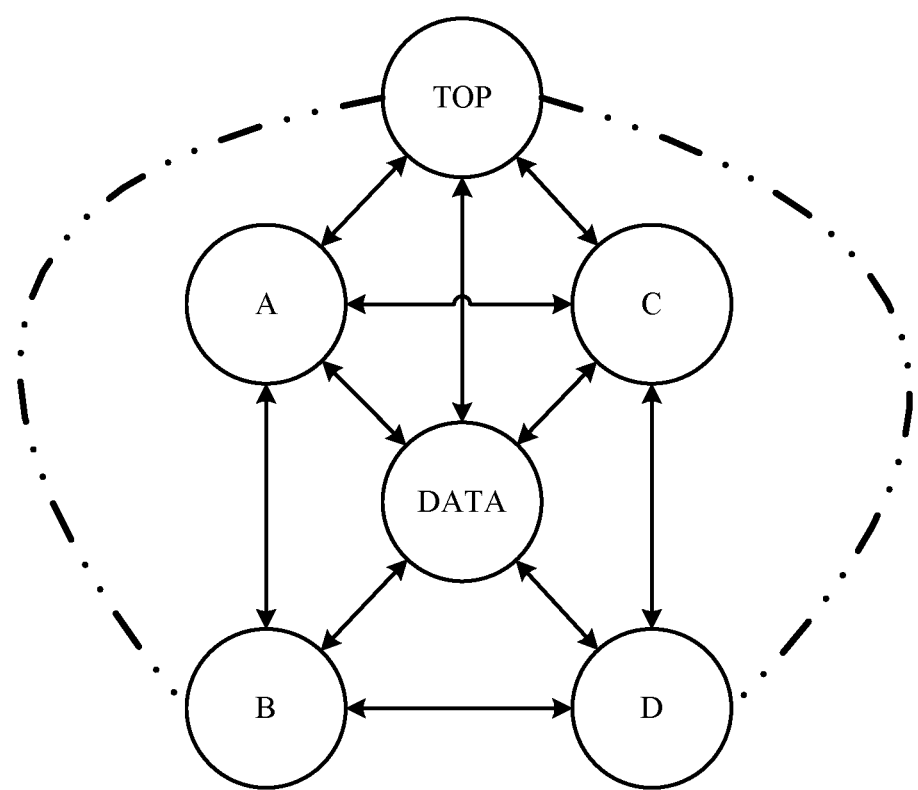
FIG. 21 is a block diagram of an example hierarchy of nodes in an IT-GRC application.

This disclosure is not limited to IT-GRC applications. Indeed, the principles of this disclosure may be implemented in data hierarchies that are completely free of the GRC related records such as authoritative source, rules, policies, controls, and the like. Instead, these arrangements may be generally illustrated with record types such as TOP, A, B, C, D, and DATA. The arrangement of FIG. 21 is a block diagram of an example database hierarchy outside the IT-GRC context. FIG. 21 illustrates all possible or permitted links under one example database hierarchy, where client links are shown by straight lines and calculated links shown by curved lines.

FIGS. 22-25 are other block diagrams of example database hierarchies outside of the IT-GRC context. In each of these hierarchies from FIGS. 21-25, every A, B, C, and D node is related to both the DATA and the TOP nodes by calculated links (not shown in FIGS. 22-25). And these hierarchies may exist simultaneously in the same set of data. With multiply linked nodes, there can be several different hierarchies they follow. There is an acknowledged TOP node, the item that reports are categorized on, and there is a node representing the DATA that rolls up to each node, but the path between these and the placement of these is open to some variation. Sometimes the data node is at the bottom of a chain. Other times it is the main node linking to each other middle node (i.e., A, B, C, D in FIGS. 21-25). There are many different combinations possible, and the disclosed multiple many-to-many relationship tables support all of them. Outside of the presently disclosed technology, it can be difficult or impossible to report on data with multiple different methods of linking it together. This is solved by use of calculated links as described herein.

Figure 7:
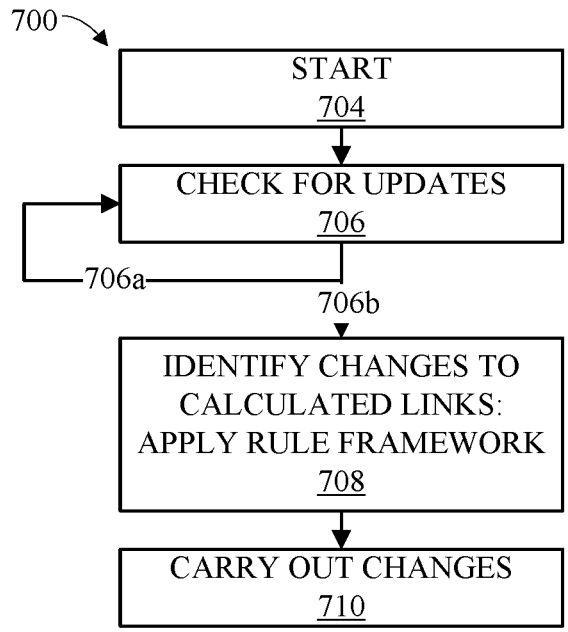
FIG. 7 is a flowcharts showing an example computer-implemented process.

FIG. 7 is a flowchart showing an example computer-implemented process. The process 700 is used to manage calculated links in a database. Without any intended limitation, the process 700 may be executed in the context of machines and hardware such as the equipment of FIGS. 1-6. The process 700 may be integrated with a database application, or executed by a separate program entirely. Without any intended limitation, one implementation performs the process 700 by executing a machine-readable program of JavaScript instructions. For ease of explanation, process 700 is depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

To support a flexible and variable hierarchy, the process 700 may be implemented to find all linkages between the authoritative sources and all policies, potential exposures, and controls, and between the control containing the test results and policies, potential exposures, and authoritative sources, in order to permit reporting aggregate results from all control test results to all directly or indirectly linked policies, potential exposures, authoritative sources, and to provide reports of all policies, potential exposures, and controls grouped by the authoritative source they are directly or indirectly linked to, without requiring the user to create every possible link.

With particular reference to FIG. 7, the process 700 starts in operation 704. In operation 706, the process 700 detects certain updates to the database structure. In one implementation, operation 706 detects client input amending a given client link between nodes. The client input in this case may include adding, deleting, or modifying one or more client links, or any combination of these. Beyond direct links, operation 706 may further check for updates to records, many-to-many relationship tables and properties contained in or related to the database 606.

Operation 706 repeats on a continual, periodic, scheduled, event-driven, or other repeating basis as shown by 706*a*. Operation 706 may be operatively coupled to a web or other graphical user interface to detect and execute substantially in real time while a user makes changes to the database 606.

After checking for updates, operation 706 also triggers operation 708 as shown by 706*b*. Operation 706*b* identifies changes to the calculated links in the subject database and applies a given rule framework such as 605 to guide appropriate changes to the calculated links. In other words, responsive to detecting the client input, operation 708 identifies any new indirect linkages between prescribed node types and all other nodes in the database attends to adding, deleting, or modifying calculated links to carry out any identified changes. In other words, operation 708 identifies any changes required of the calculated links as a consequence of the client input. Operation 708 applies the prescribed framework of rules such as 605 to (1) nodes directly or indirectly connected by the given client link before the amending, and (2) nodes directly or indirectly connected by the given client link after the amending. In accordance with operation 708, operation 710 adds, deletes, or otherwise modifies calculated links to carry out the identified changes.

As an alternative or additional feature to the process 700, calculated links may be implemented in batch. For instance, upon encountering a new or mature database with only client links, the computer server managing the database may analyze the entirety of the client links and nodes in the database and insert calculated links where applicable. In a different implementation, the process of checking for updates in 706 may be performed at longer time intervals, resulting in implementation of calculated links in mini-batch operations. One example of this is when new data is imported into the database, in which case operation 708 is triggered by the import rather than a real-time client update.

The following is one implementation of the rules framework 605, which for ease of comprehension is stated in terms of a number of functionally stated rules.

Not Permitted:
Calculated links whose underlying or constituent direct links would pass through any single type of node more than once.
Calculated links linking nodes of the same type.
Calculated links that would duplicate client links.
Calculated links created based off of other calculated links.
Calculated links to nodes other than top and data nodes.
Permitted:
Calculated links from AS-P, AS-C, AS-R.
Calculated links from C-P, C-R.

Also in the rules framework 605 or elsewhere, there may additionally be a repository of rules governing client links. For example, client links are permitted if they link: (1) AS-ASC, AS-P, AS-R, AS-CONTROL, (2) ASC-AS, ASC-P, and ASC-CONTROL, (3) P-AS, P-ASC, P-CONTROL, and P-R; (4) CONTROL-AS, CONTROL-ASC, CONTROL-P, CONTROL to Control Test Results, and CONTROL-R; (5) R-P and R-CONTROL, (6) Control Test Results to CONTROL.

Figure 8A:
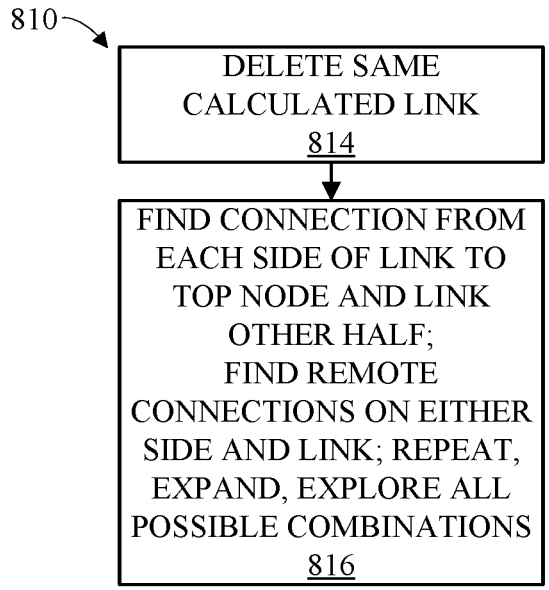
FIG. 8A is a flowchart showing an example computer-implemented process.

To show shows a specific implementation of operation 710, reference is made to FIG. 8A. FIG. 8A is a flowchart showing an example computer-implemented process. The illustrated process 810 is performed in the case where a user has added a direct link. In this event, operation 814 deletes the calculated link (if any) that is repeated by the added direct link. Next, operation 816 performs the following: responsive to the added client link indirectly forming new connections of one or more nodes to the top node, establishing a calculated link between each of these nodes and the top node; also, if the added client link indirectly forms new connections of one or more nodes to the data node, establishing a calculated link between each of these nodes and the data node.

In one implementation, operation 816 is carried out as follows. If the new client link attaches to a top node (such as AS), operation 816 finds any link between the other node, and other nodes that are also non-top and not linked to that top node, and add a calculated link, and repeat for more indirect links. So, if an AS1-C1 link is added, then operation 816 checks for direct links between C1 to any P or R, if one such link is found (for example to P1), then operation 816 checks for an existing direct or calculated link (in this case between AS1-P1), if none exist, operation 816 inserts a new calculated link between AS1 and P1, and also adds connected-by of C1. Next, operation 816 checks for the longer possible link, between C1 to P to R, or from C1 to R to P. Again, if any such is found, operation 816 searches for calculated or direct links between AS1 and the terminating P or R, and if none exists, the new calculated link is added, with a connected-by of C1 and the other intermediate node.

If a new client link links two non-top nodes together, for each side of the new link, operation 816 finds any link from each side of the new client link to the top node and forms a calculated link between the other half to it. So, if a P1-R1 link has been formed, operation 816 checks for a direct link from P1 to any AS, if found, then operation 816 checks for existing links, if none, the operation 816 inserts the new link between the AS-R1 connected by P1. Likewise, operation 816 checks for any AS linked to R1, and check and add links for all found AS to P1 connected by R1. If the new client link attaches to a data node (such as control), operation 816 finds any client link from each side of the new client link to the node and forms a calculated link of the other half to it. Operation 816 also finds any links at least two nodes away on either side, and forms a calculated link. So, the operation 816 will look for a connection of AS-C-P1, and use this to add links from any found AS to R1 connected by C-P1, and likewise look for any AS connected to R1 via C, and check and connect these items to P1. If useful, operation 816 can enumerate this process with more nodes, as in the samples where there are TOP, DATA, A, B, C, and D. This process repeats until all possible combinations have been explored.

Figure 8B:
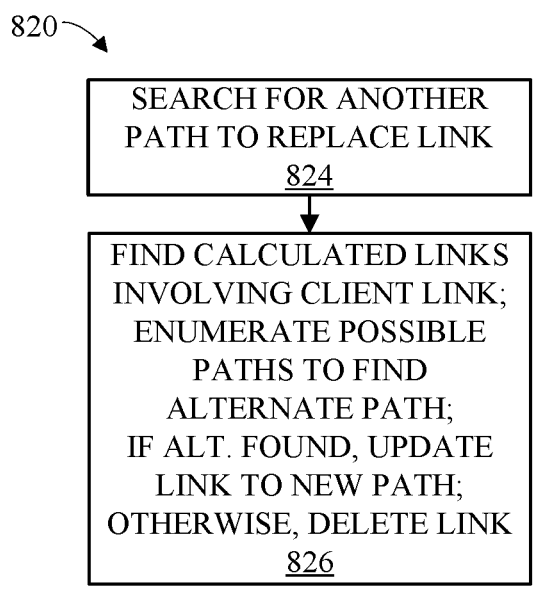
FIG. 8B is a flowchart showing an example computer-implemented process.

To show another implementation of operation 710, reference is made to FIG. 8B, which is a flowchart showing an example computer-implemented process. The illustrated process 820 is performed in the case where a user has deleted a direct link. The process 820 searches for any replacement paths via remaining links that still achieve the deleted client link. If no replacement paths are found, the process locates all calculated links representing paths with the deleted client link as a constituent member. If one or more replacement paths are found, the process retains or updates calculated links representing paths with the deleted client link as a constituent member.

In one implementation, the process 820 is carried out with operations 824 and 826. Operation 824 searches for another path to replace the link. Operation 826 finds all calculated links involving this link, and enumerates all possible paths to find an alternative path if available. If so, operation 826 updates the link to the new path, otherwise deletes the calculated link via the following method. If the deleted direct link links directly to a top or data node, all calculated links linking to that node are checked to see if they involve the other node. So if a link from AS1-P1 is deleted, operation 826 searches all calculated links linking to AS1 that include P1 in the connected-by field. If so, then operation 826 seeks replacement paths. If neither node is a top or data node, then calculated links connected by both nodes are sought. Again as an example, if P1-R1 is deleted, operation 826 searches all calculated links that contain both P1 and R1 in the connected-by link, and these are checked for a replacement path.

Figure 8C:
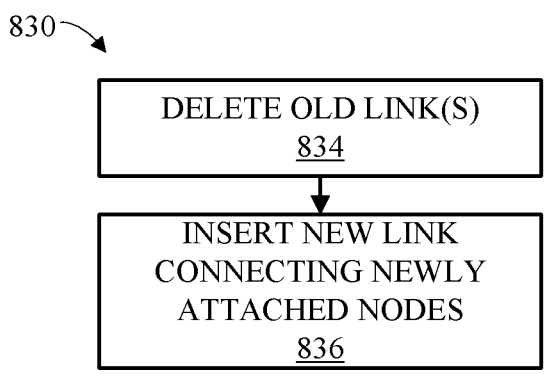
FIG. 8C is a flowchart showing an example computer-implemented process.
Figure 12:
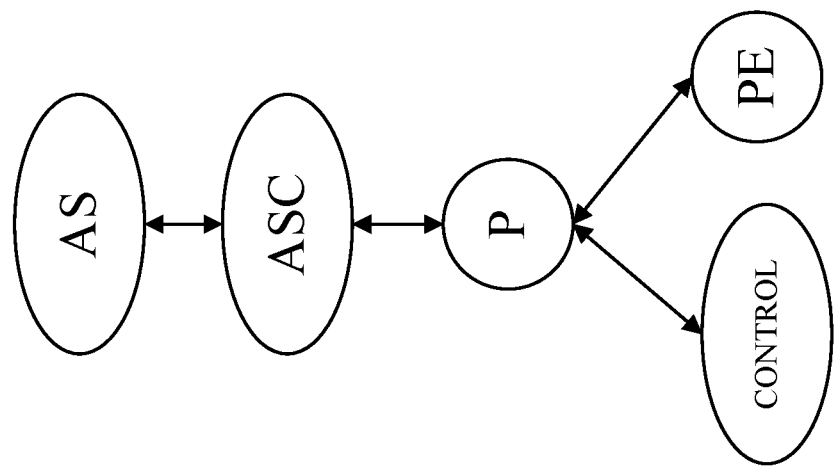
FIG. 12 is a block diagram of an example database hierarchy in an IT-GRC application.

To show another implementation of operation 710, reference is made to FIG. 8C, which is a flowchart showing an example computer-implemented process. The illustrated process 830 is performed in the case where a user has modified a direct link. In this event, operation 834 deletes the old link with all of the necessary updates taking place. Operation 836 adds a calculated link connecting all newly attached nodes. In one implementation, the process 830 may be implemented as a combination of the add link process 810 and the delete link process 820, as appropriate.

As explained above, calculated links may be created and updated substantially in real time with user input. Therefore, calculated links may be properly placed before the client view, creating reports, searches, or otherwise analyzes data from the database 606. One advantage of this is the client can, at any moment, view of the related policies, potential exposures, and controls for an authoritative source, or all authoritative sources for all policies, controls, and potential exposures. In this respect, the server 600 or another component may provide one or more web or other graphical user interfaces displaying current and user navigable policies, potential exposures, and controls for an authoritative source, and/or authoritative sources for all policies, controls, and potential exposures.

One advantage of ensuring that calculated links are always up to date is this information can be used to provide real time feedback when a control test fails, including feedback as to which policies, potential exposures, and authoritative sources are failing. Furthermore, with full information about which items the user linked directly together, and which items were linked together by calculated links, reports can be written and decisions made based on how everything is linked together, or every link can be treated equally for reports. The number of passing and failing control tests linked directly or indirectly for every policy, potential exposure, and authoritative source can be calculated and provided to see which areas are in danger from a particular control test failure. Calculated links, as discussed herein, supports the generation of reports that span multiple layers of any hierarchy the client may choose, to aggregate data from the control to all policies, potential exposures, and authoritative sources, to provide instant, constantly updated information about the aggregated control test information and the authoritative source to which each item is related.

In a different implementation, rather than creating and updating calculated links substantially in real time with client updates, the system may implement calculated links on-the-fly in response to client requests to view, create reports, search, or otherwise analyze or modify data.

Figure 14:
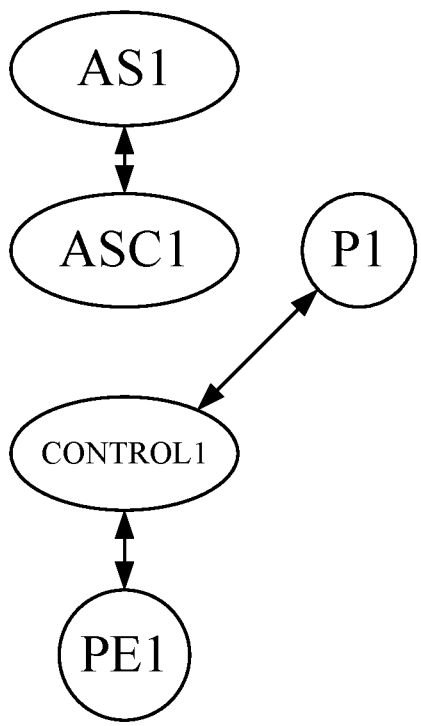
FIG. 14 is a block diagram of an example database hierarchy in an IT-GRC application.
Figure 15:
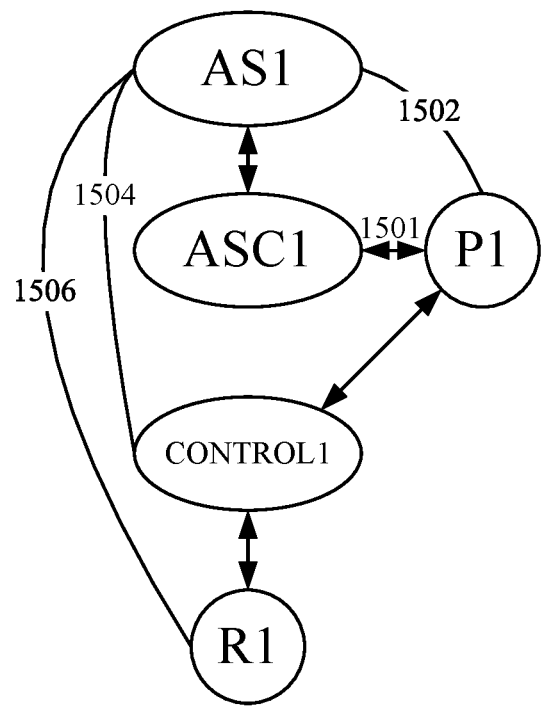
FIG. 15 is a block diagram of an example database hierarchy in an IT-GRC application.
Figure 16:
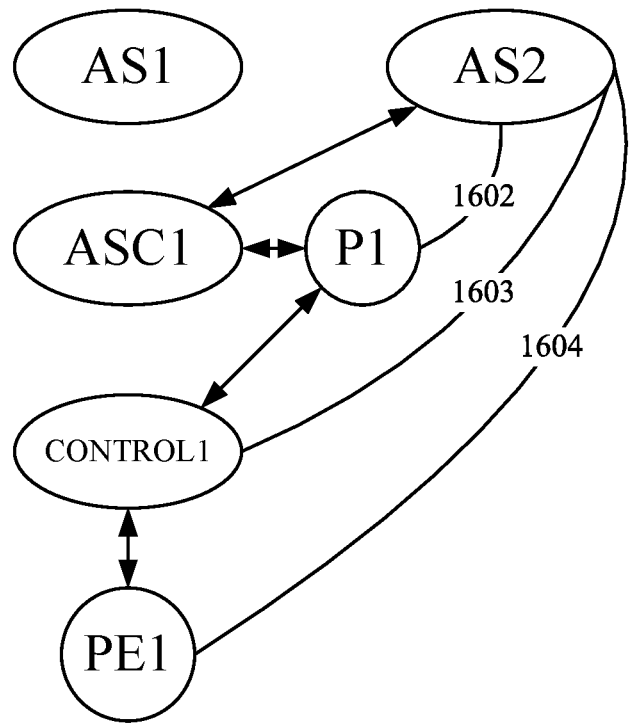
FIG. 16 is a block diagram of an example database hierarchy in an IT-GRC application.

To illustrate an example of calculated link formation as carried out by the process 700, an example is illustrated with reference to the data hierarchies of FIGS. 14-16. FIGS. 14-16 are block diagrams of different database hierarchies of nodes in an IT-GRC context. In these diagrams, lines with arrowheads represent client-implemented links, and lines without arrowheads depict calculated links.

FIG. 14 shows an initial state of the database records. As shown in FIG. 14, these records do not include any calculated links, only CONTROL1 linked to P1 and R1. Table 1 is an example table including direct and/or calculated links that may be used to represent the structure of the FIG. 14 as stored in the tables 607A.

TABLE 1

Direct/Calculated Links to Represent Structure of FIG. 14

| FROM NODE (NUMBER AND NAME) | TO NODE (NUMBER AND NAME) | IS CALCULATED LINK | CONNECTED BY | FIG. LINE NO. |
|---|---|---|---|---|
| AS1 - HIPAA | ASC1.2 | no | | |
| C1 - Firewall software is up to date, validated monthly | P1 - Firewall software will be maintained and all known issues will be updated | no | | |
| C1 - Firewall software is up to date, validated monthly | R1 - Data breach | no | | |

FIG. 15 shows a client link 1501 having been added between ASC1 and P1. This may occur, for example, when the client submits an update in operation 706. At this point, the system adds a calculated link 1502, as well as calculated links 1504 and 1506. These calculated links therefore join AS1 and CONTROL1 as well as P1 and R1. Table 2 is an example table including direct and/or calculated links that may be used to represent the structure of the FIG. 15 as stored in the tables 607A.

TABLE 2

Direct/Calculated Links to Represent Structure of FIG. 15

| FROM NODE (NUMBER AND NAME) | TO NODE (NUMBER AND NAME) | IS CALCULATED LINK | CONNECTED BY | FIG. LINE NO. |
|---|---|---|---|---|
| AS1 - HIPAA | ASC2.4 | no | | |
| AS1 - HIPAA | ASC1.2 | no | | |
| AS1 - HIPAA | C1 - Firewall software is up to date, validated monthly | calc_indirect | Via 1.2, AS1 - HIPAA 'ASC1 - HIPAA Privacy Rule' Via P1 - Firewall software will be maintained' | 1504 |
| C1 - Firewall software is up to date, validated monthly | P1 - Firewall software will be maintained and all known issues will be updated | no | | |

TABLE 2-continued

Direct/Calculated Links to Represent Structure of FIG. 15

| FROM NODE (NUMBER AND NAME) | TO NODE (NUMBER AND NAME) | IS CALCULATED LINK | CONNECTED BY | FIG. LINE NO. |
|---|---|---|---|---|
| ASC1.2 | P1 - Firewall software will be maintained and all known issues will be updated | no | | |
| AS1 - HIPAA | P1 - Firewall software will be maintained and all known issues will be updated | calc_direct | Via 1.2, AS1 - HIPAA 'ASC1 - HIPAA Privacy Rule' | 1502 |
| AS1 - HIPAA | R1 - Data breach | calc_indirect | Via 1.2, AS1 - HIPAA 'ASC1 - HIPAA Privacy Rule' Via P1 - Firewall software will be maintained' Via C1 - Firewall software is up to date, va' | 1506 |
| C1 - Firewall software is up to date, validated monthly | R1 - Data breach | no | | |

FIG. 16 reflects further client or user actions that replace AS1 with a new authoritative source AS2. The client actions include deleting all existing client links to AS1 and adding client links of items to the AS2. The user actions may occur, for example, in operation 706 of FIG. 7 as discussed above. In response, the computer server redirects the calculated paths, operation 708 can find only those that involve a newly updated or deleted link. This helps provide end users information about how items are linked. Table 3 is an example table including direct and/or calculated links that may be used to represent the structure of the FIG. 16 as stored in the tables 607A.

TABLE 3

Direct/Calculated Links to Represent Structure of FIG. 16

Figure 17:
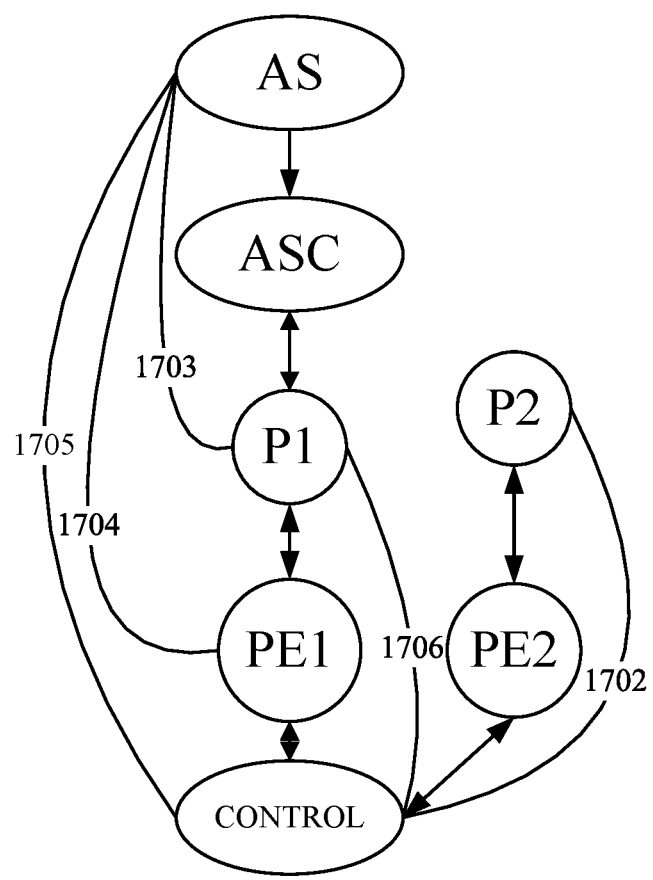
FIG. 17 is a block diagram of an example database hierarchy in an IT-GRC application.

| FROM NODE (NUMBER AND NAME) | TO NODE (NUMBER AND NAME) | IS CALCULATED LINK | CONNECTED BY | FIG. LINE NO. |
|---|---|---|---|---|
| AS2 - HIPAA 2015 | ASC1.2 | no | | |
| AS2 - HIPAA 2015 | C1 - Firewall software is up to date, validated monthly | calc_indirect | Via 1.2, AS2 - HIPAA 2015 'ASC1' HIPAA Privacy Rule' Via KB0010001 'P1 - Firewall software will be maintained' | 1603 |
| C1 - Firewall software is up to date, validated monthly | P1 - Firewall software will be maintained and all known issues will be updated | no | | |
| ASC1.2 | P1 - Firewall software will be maintained and all (mown issues will be updated | no | | |
| AS2 - HIPAA 2015 | P1 - Firewall software will be maintained and all known issues will be updated | calc_direct | Via 1.2, AS2 - HIPAA 2015 'ASC1' HIPAA Privacy Rule' | 1602 |
| AS2 - HIPAA 2015 | R1 - Data breach | calc_indirect | Via 1.2, AS2 - HIPAA 2015 'ASC1' HIPAA Privacy Rule' Via KB0010001 'P1 - Firewall software will be maintained' Via CTRL0002001 'C1 - Firewall software is up to date, va' | 1604 |
| C1 - Firewall software is up to date, validated monthly | R1 - Data breach | no | | | links as shown by 1602-1604. This may occur in operations 708 and 710 of FIG. 7 as discussed above. One mechanism used to find links using a particular path is a connected-by field that contains the path. With this, rather than check all FIG. 17 shows another example hierarchy of nodes in an IT-GRC application. A calculated link will only go through one type of node once, as per the rules 605. The following calculated links are created: (1) link 1703 from AS to P1 via ASC, (2) link 1704 from AS to R1 via ASC and P1, (3) link 1705 from AS to CONTROL via ASC and P1 and R1, (4) link 1706 from CONTROL to P1 via R1, and (5) link 1702 from CONTROL to P2 via R2. Neither P2 nor R2 connect to AS, as there would already be a policy and potential exposure in the necessary path.

In one implementation, operation 708 only passes through one node type once, for each link. Thus, as illustrated by FIG. 17, operations 708-710 cannot link the AS to P2 because the underlying direct links would proceed through two potential exposure nodes (namely PE1 and PE2). For similar reasons, operations 708-710 cannot link the AS to P2 because the underlying direct links would proceed through two policy nodes (namely P2 and P1).

Figure 20:
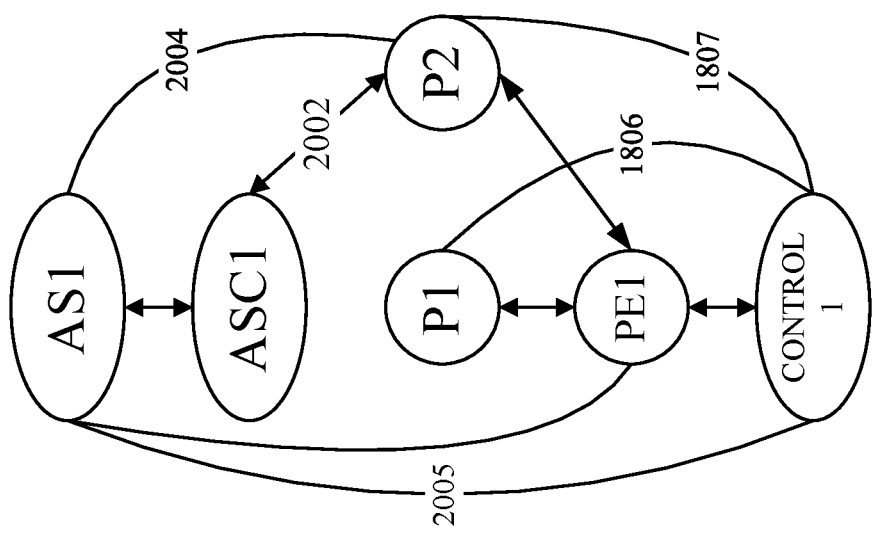
FIG. 20 is a block diagram of an example database hierarchy in an IT-GRC application.
Figure 19:
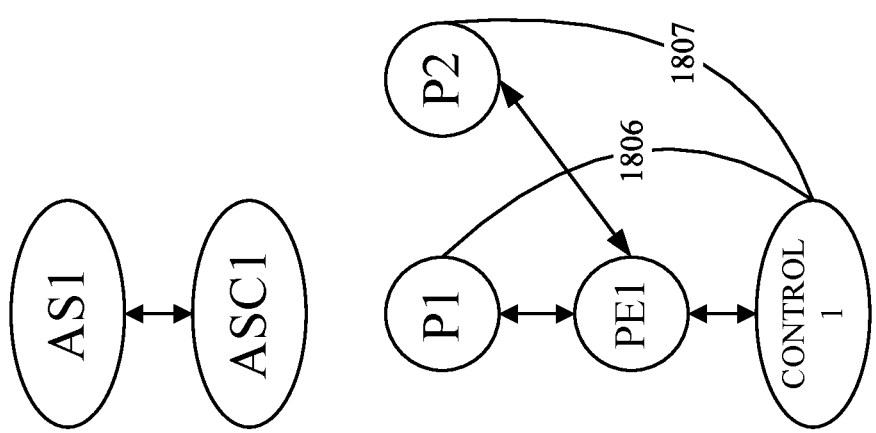
FIG. 19 is a block diagram of an example database hierarchy in an IT-GRC application.
Figure 18:
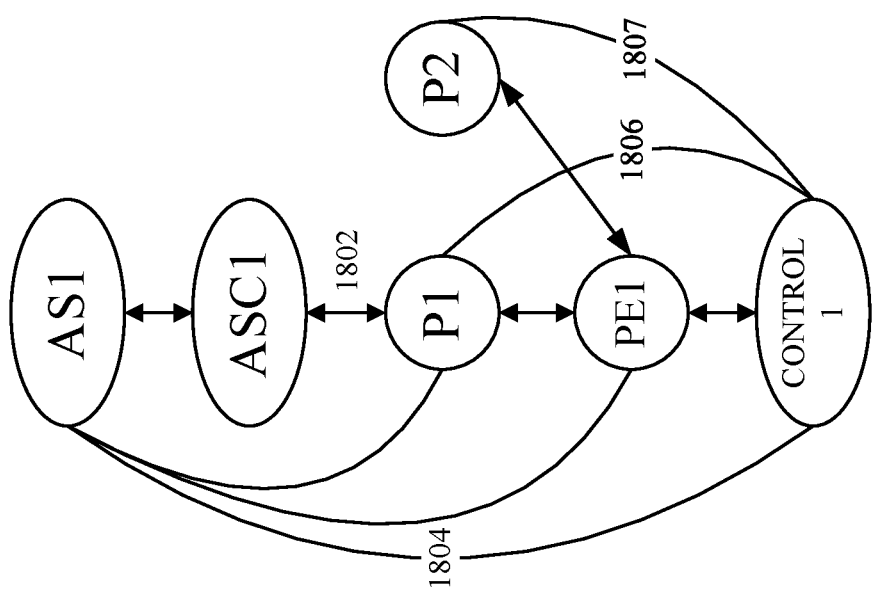
FIG. 18 is a block diagram of an example database hierarchy in an IT-GRC application.

FIGS. 18-20 show further hierarchies of nodes in an IT-GRC application. These depict an example of repathing, described as follows. In FIG. 18, AS1 is linked through to CONTROL1 via ASC1 to P1 to R1. Table 4 is an example table including direct and/or calculated links that may be used to represent the structure of the FIG. 18 as stored in the tables 607A.

TABLE 4

Direct/Calculated Links to Represent Structure of FIG. 18

| FROM NODE (NUMBER AND NAME) | TO NODE (NUMBER AND NAME) | IS CALCULATED LINK | CONNECTED BY | FIG. LINE NO. |
|---|---|---|---|---|
| AS1 - HIPAA | ASC1.2 | no | | |
| AS1 - HIPAA | C1 - Firewall software is up to date, validated monthly | calc_indirect | Via 1.2, AS1 - HIPAA 'ASC1 - HIPAA Privacy Rule' Via KB0010001 'P1 - Firewall software will be maintained' Via RISK0002001 'R1 - Data breach' | 1804 |
| C1 - Firewall software is up to date, validated monthly | P1 - Firewall software will be maintained and all known issues will be updated | calc_indirect | Via RISK0002001 'R1 - Data breach' | 1806 |
| C1 - Firewall software is up to date, validated monthly | P2 - Customer credit card information is not shown to clerks | calc_indirect | Via R1SK0002001 'R1 - Data breach' | 1807 |
| ASC1.2 | P1 - Firewall software will be maintained and all known issues will be updated | no | | 1802 |
| AS1 - HIPAA | P1 - Firewall software will be maintained and all known issues will be updated | calc_direct | Via 1.2, AS1 - HIPAA 'ASC1 - HIPAA Privacy Rule' | 1804 |
| AS1 - HIPAA | R1 - Data breach | calc_indirect | Via 1.2, AS1 - HIPAA 'ASC1 - HIPAA Privacy Rule' Via KB0010001 'P1 - Firewall software will be maintained' | 1804 |
| C1 - Firewall software is up to date, validated monthly | R1 - Data breach | no | | |
| P2 - Customer credit card information is not shown to clerks | R1 - Data breach | no | | |
| P1 - Firewall software will be maintained and all known issues will be updated | R1 - Data breach | no | | |

If the client breaks the link 1802 between ASC1 and P1 (FIG. 18), the calculated links 1804 are broken and they are automatically removed in operation 710, as reflected in FIG. 19. The calculated links 1806-1807 remain. Table 5 is an example table including direct and/or calculated links that may be used to represent the structure of the FIG. 19 in as stored in the tables 607A.

TABLE 5

Direct/Calculated Links to Represent Structure of FIG. 19

| FROM NODE (NUMBER AND NAME) | TO NODE (NUMBER AND NAME) | IS CALCULATED LINK | CONNECTED BY | |
|---|---|---|---|---|
| AS1 - HIPAA | ASC1.2 | no | | |
| C1 - Firewall software is up | P1 - Firewall software will be | calc_indirect | Via RISK0002001 | 1806 |

TABLE 5-continued

Direct/Calculated Links to Represent Structure of FIG. 19

| FROM NODE (NUMBER AND NAME) | TO NODE (NUMBER AND NAME) | IS CALCULATED LINK | CONNECTED BY | |
|---|---|---|---|---|
| to date, validated monthly | maintained and all known issues will be updated | | 'R1 - Data breach' | |
| C1 - Firewall software is up to date, validated monthly | P2 - Customer credit card information is not shown to clerks | calc_indirect | Via RISK0002001 'R1 - Data breach' | 1807 |
| C1 - Firewall software is up to date, validated monthly | R1 - Data breach | no | P2 - Customer credit card information is not shown to clerks | R1 - Data breach |
| P1 - Firewall software will be maintained and all known issues will be updated | R1 - Data breach | no | | |

As shown by FIG. 20, if there is an alternative path at the time of the delete or created later (by client link 2002 for example), then new calculated links 2004-2005 will find the new path. Table 6 is an example table including direct and/or calculated links that may be used to represent the structure of the FIG. 20 as stored in the tables 607A.

Figure 27:
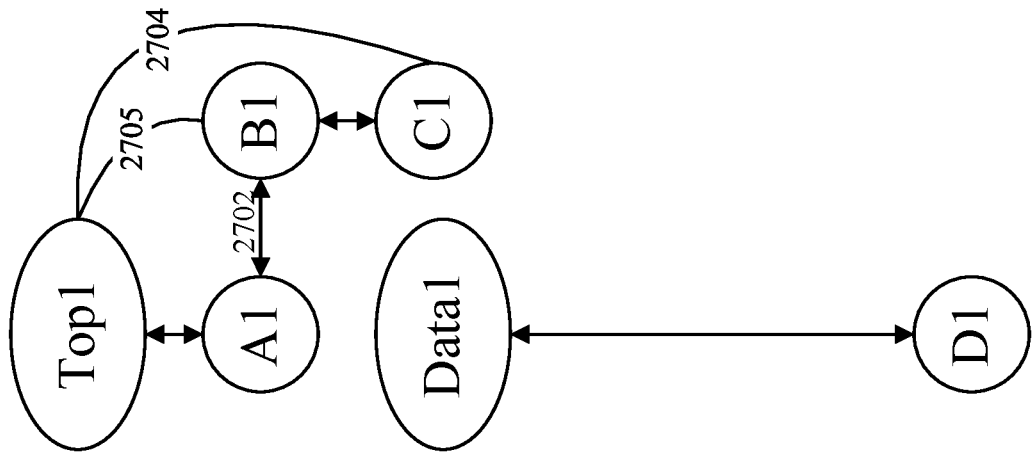
FIG. 27 is a block diagram of an example database hierarchy outside the IT-GRC context.
Figure 26:
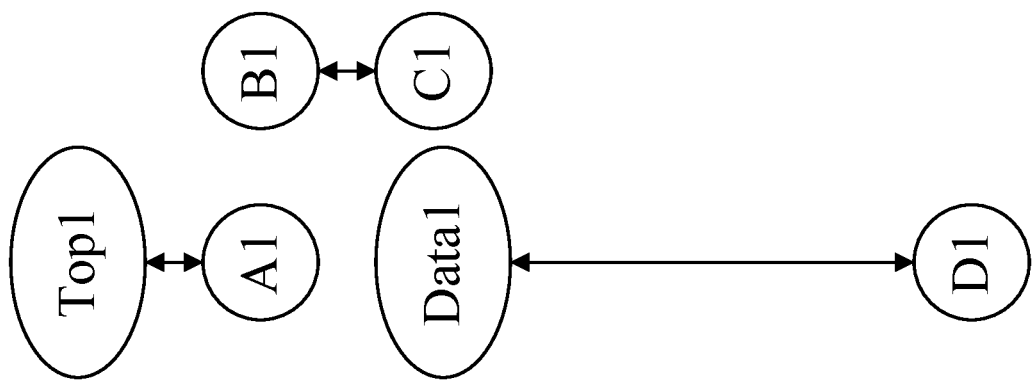
FIG. 26 is a block diagram of an example database hierarchy outside the IT-GRC context.
Figure 28:
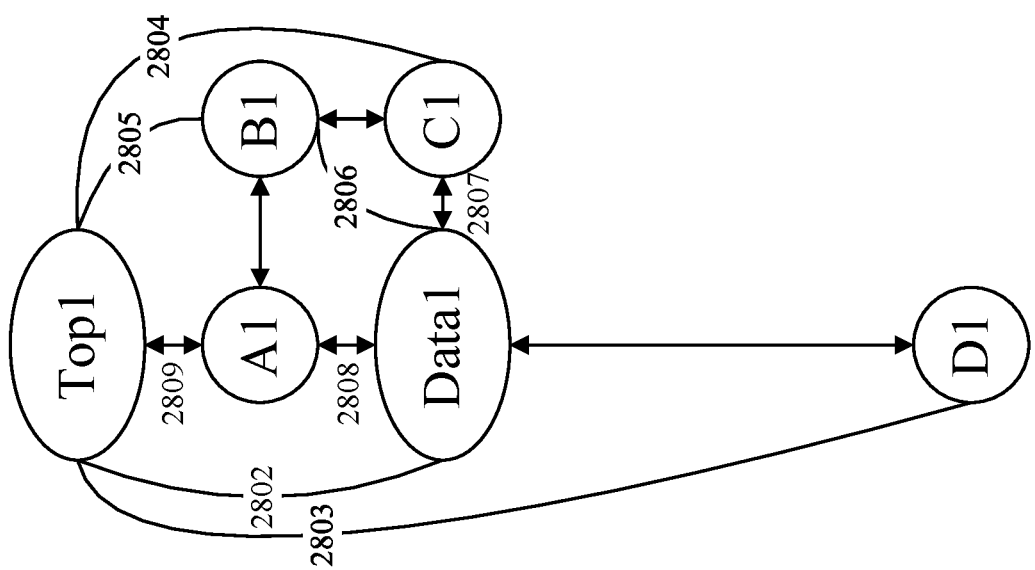
FIG. 28 is a block diagram of an example database hierarchy outside the IT-GRC context.

FIGS. 26-29 are block diagrams that show further hierarchies of nodes, outside of the IT-GRC context. Initially, there are no calculated links as illustrated in FIG. 26. In FIG. 27, a client link 2702 is added between A1 and B1, resulting in generation of calculated links 2704-2705 between TOP1 and B1 and C1. In FIG. 28, a client link 2808 between A1

TABLE 6

Direct/Calculated Links to Represent Structure of FIG. 20

Figure 29:
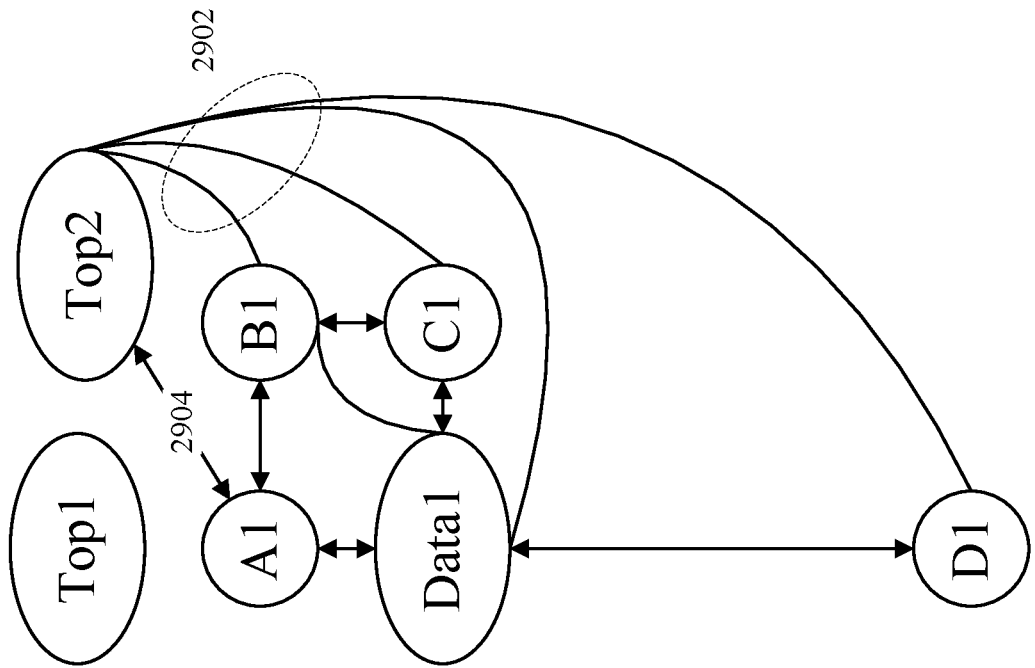
FIG. 29 is a block diagram of an example database hierarchy outside the IT-GRC context.

| FROM NODE (NUMBER AND NAME) | TO NODE (NUMBER AND NAME) | IS CALCULATED LINK | CONNECTED BY | FIG. LINK |
|---|---|---|---|---|
| AS1 - HIPAA | ASC1.2 | no | | |
| AS1 - HIPAA | C1 - Firewall software is up to date, validated monthly | calc_indirect | Via 1.2, AS1 - HIPAA 'ASC1-HIPAA Privacy Rule 'Via KB0010002 'P2 - Customer credit card information is n' Via RISK0002001 'R1 - Data breach' | |
| C1 - Firewall software is up to date, validated monthly | P1 - firewall software will be maintained and all known issues will be updated | calc_indirect | Via RISK0002001 'R1 - Data breach' | 1806 |
| C1 - Firewall software is up to date, validated monthly | P2 - Customer credit card information is not shown to clerks | calc_indirect | Via RISK0002001 'R1 - Data breach' | 1807, 2005 |
| ASC1.2 | P2 - Customer credit card information is not shown to clerks | no | | 2002 |
| AS1 - HIPAA | P2 - Customer credit card information is not shown to clerks | calc_direct | Via 1.2, AS1 - HIPAA 'ASC1 - HIPAA Privacy Rule' | 2004 |
| AS1 - HIPAA | R1 - Data breach | calc_indirect | Via 1.2, AS1 - HIPAA 'ASC1-HIPAA Privacy Rule 'Via KB0010002 'P2 - Customer credit card information is n' | |
| C1 - Firewall software is up to date, validated monthly | R1 - Data breach | no | | |
| P2 - Customer credit card information is not shown to clerks | R1 - Data breach | no | | |
| P1 - Firewall software will be maintained and all known issues will be updated | R1 - Data breach | no | | | and DATA1 is added, resulting in generation of calculated links 2802-2803 between both DATA and D1 and TOP1 as well as calculated links 2804-2807 between B1 and C1 and DATA1. In FIG. 29, the client has altered the link 2809 (from FIG. 28), shifting it to a new location 2904; this results in deletion of existing calculated links 2802-2805 (FIG. 29), and adding calculated links 2902. This reflects redirection of calculated links and adjustment of their connected-by values in accordance with operations 708-710.

One mechanism used to find links using a particular path is a connected-by field that contains the path, as found in the relevant table 607A. With this, rather than check all paths, operation 804 can find only those that involve a newly updated or deleted link. This helps provide end users information about how items are linked. In one implementation, operation 804 only passes through one node type once, for each link. Thus, as illustrated by FIGS. 26-29, operation 804 can link from top to A1 to B1 to C1 to data to C2 to B2, and link A1 to data, but not link A1 to B2.

Figure 30:
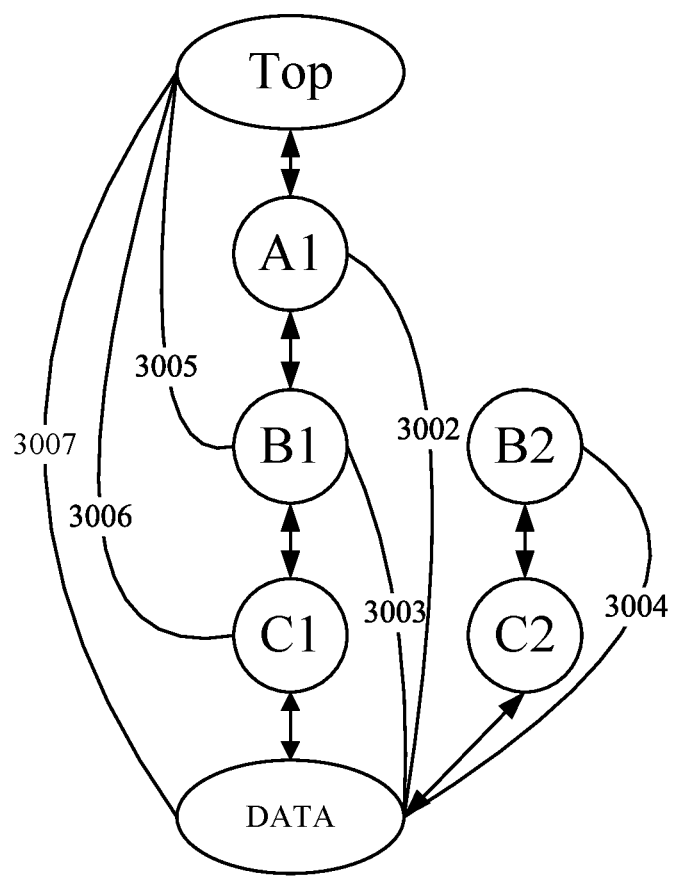
FIG. 30 is a block diagram of an example database hierarchy outside the IT-GRC context.

FIG. 30 is a block diagram that shows another example hierarchy of nodes, outside the IT-GRC context. Calculated links are shown at 3002-3007. A calculated link will only go through one type of node once. The following calculated links are created: (1) link 3005 proceeding from TOP to B1 via A1, (2) link 3006 proceeding from TOP to C1 via A1 and B1, (3) link 3007 proceeding from TOP to DATA via A1 and B1 and C1, (4) link 3002 from DATA to A1 via B1 and C1, (5) link 3003 from DATA to B1 via C1, (6) link 3004 from DATA to B2 via C2. However, neither B2 nor C2 connect to TOP, as there is already a B and a C type of node in the path from B2 or C2 to TOP via DATA.

Figure 33:
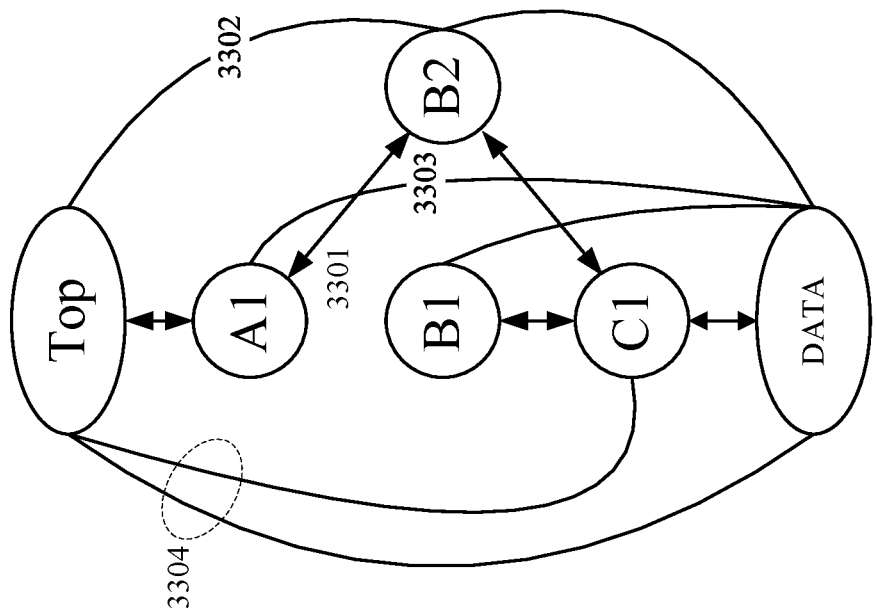
FIG. 33 is a block diagram of an example database hierarchy outside the IT-GRC context.
Figure 32:
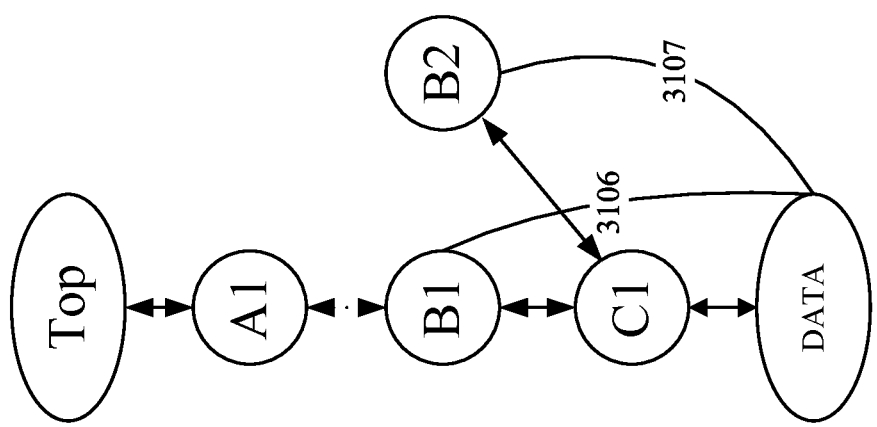
FIG. 32 is a block diagram of an example database hierarchy outside the IT-GRC context.
Figure 31:
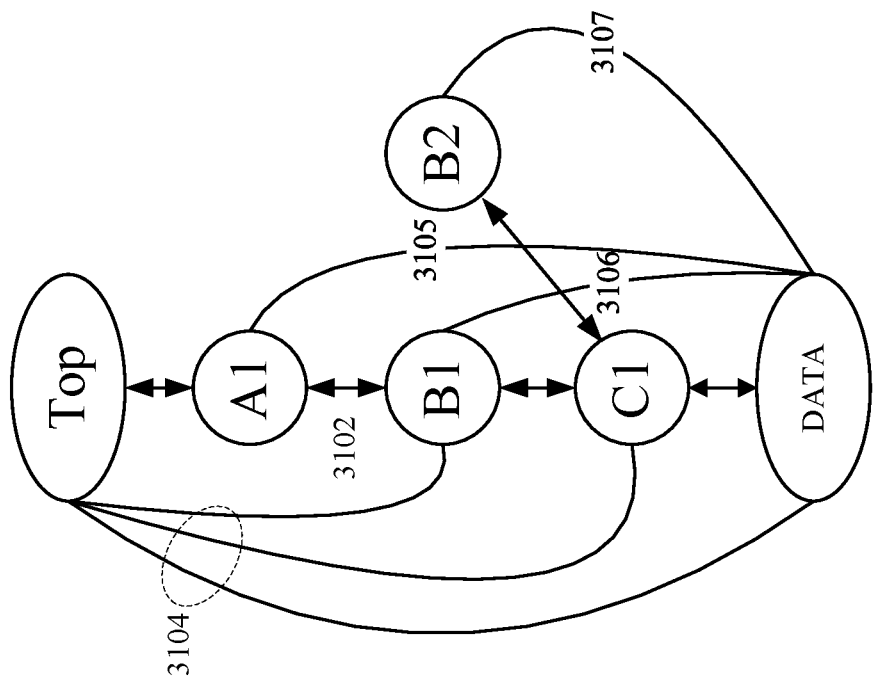
FIG. 31 is a block diagram of an example database hierarchy outside the IT-GRC context.

FIGS. 31-33 are block diagrams that show further example data hierarchies, outside the IT-GRC context. These depict an example of repathing, described as follows. In FIG. 31, TOP is linked through to DATA through a chain of client links. Calculated links exist at 3104-3107. If the client link 3102 is broken, then this breaks several calculated links, namely 3104-3105, as illustrated in FIG. 32. As illustrated by calculated links 3302-3304 in FIG. 33, if there is an alternative path, at the time of the delete, or created later (such as by addition of client link 3301), new calculated links are generated according to the new path.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described aspects may employ various integrated circuit components, e.g., memory elements, processing elements, logic elements, look-up tables, and the like, which may carry out a variety of functions under the control of one or more microprocessors or other control devices. Similarly, where the elements of the described aspects are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the invention could employ any number of conventional techniques for electronics configuration, signal processing and/or control, data processing and the like. The words "mechanism" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

Information, data, and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

All references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A server, comprising:
   a processor; and
   a memory comprising:
      a hierarchical architecture database comprising a plurality of data records represented by a plurality of respective nodes, wherein one or more client-originated links connect one or more respective pairs of nodes of the plurality of respective nodes; and
      machine-readable instructions that, when executed by the processor, cause the processor to:
         determine, based on a plurality of rules, one or more calculated links that directly connect one or more respective additional pairs of nodes of the plurality of respective nodes that would otherwise be only indirectly connected via the one or more client-originated links and one or more intermediate nodes of the plurality of respective nodes, wherein a first rule of the plurality of rules is configured to prohibit generating a calculated link from linking nodes of the same node type; and
         automatically generate the one or more calculated links to directly connect the one or more respective additional pairs of nodes, wherein the one or more client-originated links correspond to respective data records within the hierarchical architecture database that indicate respective relationships between the one or more respective pairs of nodes and the one or more calculated links correspond to respective additional data records within the hierarchical architecture database that indicate respective additional relationships between the one or more respective additional pairs of nodes.

2. The server of claim 1, wherein the plurality of rules comprises a second rule configured to prohibit generating a calculated link that duplicates a client-originated link.

3. The server of claim 1, wherein the one or more client-originated links and the one or more calculated links represent every possible interconnection between the plurality of respective nodes in the hierarchical architecture database based on the plurality of rules.

4. The server of claim 1, wherein the instructions cause the processor to:
   add a client-originated link between two nodes of the plurality of respective nodes;
   determine whether the one or more calculated links duplicate the client-originated link; and delete the one or more calculated links that duplicate the client-originated link.

5. The server of claim 1, wherein the instructions cause the processor to:
   delete a client-originated link of the one or more client-originated links;
   determine whether the one or more calculated links represent respective paths that would include the client-originated link; and
   delete the one or more calculated links representing respective paths that would include the client-originated link.

6. The server of claim 5, wherein the instructions cause the processor to:
   determine whether the one or more calculated links represent respective alternate paths without the client-originated link before deleting the one or more calculated links; and
   retain the one or more calculated links representing respective alternate paths without the client-originated link in the hierarchical architecture database.

7. The server of claim 1, wherein the instructions cause the processor to:
   aggregate node data from each node of the plurality of respective nodes based on the one or more client-originated links and the one or more calculated links; and
   generate a report for display on a client device, wherein the report comprises the aggregated node data.

8. A method of managing a hierarchical architecture database in a server, comprising:
   determining, via a processor, one or more calculated links based on a plurality of rules, wherein the one or more calculated links directly connect one or more respective pairs of nodes of a plurality of nodes that represent a plurality of respective data records within a hierarchical architecture database, wherein one or more client-originated links connect one or more respective additional pairs of nodes of the plurality of nodes, wherein the one or more respective pairs of nodes would otherwise be only indirectly connected via the one or more client-originated links and one or more intermediate nodes of the plurality of nodes, and wherein a first rule of the plurality of rules is configured to prohibit generating a calculated link from linking nodes of the same node type; and
   automatically generating, via the processor, the one or more calculated links to directly connect the one or more respective pairs of nodes, wherein the one or more client-originated links correspond to respective data records within the hierarchical architecture database that indicate respective relationships between the one or more respective additional pairs of nodes and the one or more calculated links correspond to respective additional data records within the hierarchical architecture database that indicate respective additional relationships between the one or more respective pairs of nodes.

9. The method of claim 8, wherein the plurality of rules comprises a second rule configured to prohibit a calculated link that duplicates a client link.

10. The method of claim 8, comprising:
    adding a client-originated link between two nodes of the plurality of nodes;
    determining whether the one or more calculated links or one or more existing calculated links duplicate the client-originated link; and
    deleting the one or more calculated links or the one or more existing calculated links that duplicate the client-originated link.

11. The method of claim 8, comprising:
    deleting a client-originated link of the one or more client-originated links;
    determining whether the one or more calculated links represent respective paths that would include the client-originated link; and
    deleting the one or more calculated links representing respective paths that would include the client-originated link.

12. The method of claim 8, comprising:
    adding, deleting, or modifying a client-originated link of the one or more client-originated links;
    determining whether the one or more calculated links or one or more existing calculated links are severed in response to adding, deleting, or modifying the client-originated link; and
    deleting the one or more calculated links or the one or more existing calculated links that are severed.

13. The method of claim 8, comprising:
    aggregating node data from each node of the plurality of nodes based on the one or more client-originated links, the one or more calculated links, and one or more existing calculated links; and
    generating a report for display on a client device, wherein the report comprises the aggregated node data.

14. The method of claim 13, comprising updating the one or more calculated links, the one or more existing calculated links, and the aggregated node data of the report in response to a modification of the one or more client-originated links in the hierarchical architecture database.

15. A non-transitory, computer-readable storage medium, comprising machine-readable instructions that, when executed by a processor, cause the processor to:
    determine one or more calculated links based on a plurality of rules, wherein the one or more calculated links directly connect one or more respective pairs of nodes of a plurality of nodes that represent a plurality of respective data records within a hierarchical architecture database, wherein one or more client-originated links connect one or more respective additional pairs of nodes of the plurality of nodes, wherein the one or more respective pairs of nodes would otherwise be only indirectly connected via the one or more client-originated links and one or more intermediate nodes of the plurality of nodes, and wherein a first rule of the plurality of rules is configured to prohibit generating a calculated link from linking nodes of the same node type; and
    automatically generate the one or more calculated links to directly connect the one or more respective pairs of nodes, wherein the one or more client-originated links correspond to respective data records within the hierarchical architecture database that indicate respective relationships between the one or more respective additional pairs of nodes and the one or more calculated links correspond to respective additional data records within the hierarchical architecture database that indicate respective additional relationships between the one or more respective pairs of nodes.

16. The non-transitory, computer-readable storage medium of claim 15, wherein the plurality of rules comprises a second rule configured to prohibit a calculated link that duplicates a client link.

17. The non-transitory, computer-readable storage medium of claim 15, wherein the instructions cause the processor to:
- add a client-originated link between two nodes of the plurality of nodes;
- determine whether the one or more calculated links duplicate the client-originated link; and
- delete the one or more calculated links that duplicate the client-originated link.

18. The non-transitory, computer-readable storage medium of claim 15, wherein the instructions cause the processor to:
- delete a client-originated link of the one or more client-originated links;
- determine whether the one or more calculated links represent respective paths that would include the client-originated link; and
- delete the one or more calculated links representing respective paths that would include the client-originated link.

19. The method of claim 8, comprising determining, via the processor, whether the one or more calculated links duplicate one or more existing calculated links in the hierarchical architecture database; and
- wherein the one or more calculated links are automatically generated such that the one or more calculated links do not duplicate the one or more existing calculated links in the hierarchical architecture database.

20. The non-transitory, computer-readable storage medium of claim 15, wherein the instructions cause the processor to:
- aggregate node data from each node of the plurality of nodes based on the one or more client-originated links and the one or more calculated links; and
- generate a report for display on a client device, wherein the report comprises the aggregated node data.

\* \* \* \* \*